(12) United States Patent
Kim

(10) Patent No.: US 11,067,981 B2
(45) Date of Patent: Jul. 20, 2021

(54) AIRCRAFT CONTROL MODE TRANSITION SMOOTHING

(71) Applicant: Textron Innovations Inc., Providence, RI (US)

(72) Inventor: Sung Kyun Kim, Bedford, TX (US)

(73) Assignee: TEXTRON INNOVATIONS, INC., Providence, RI (US)

( * ) Notice: Subject to any disclaimer, the term of this patent is extended or adjusted under 35 U.S.C. 154(b) by 227 days.

(21) Appl. No.: 16/253,037

(22) Filed: Jan. 21, 2019

(65) Prior Publication Data

US 2019/0155282 A1 May 23, 2019

Related U.S. Application Data

(63) Continuation-in-part of application No. 16/108,479, filed on Aug. 22, 2018, now Pat. No. 10,691,140.
(Continued)

(51) Int. Cl.
| | | |
|---|---|---|
| *G05D 1/00* | (2006.01) | |
| *B64C 13/50* | (2006.01) | |
| *G05D 1/08* | (2006.01) | |

(52) U.S. Cl.
CPC ......... *G05D 1/0061* (2013.01); *B64C 13/503* (2013.01); *G05D 1/0858* (2013.01)

(58) Field of Classification Search
CPC ............. B60W 2310/00; B60W 30/00; B60W 2520/00; B60W 2720/00; B60W 2720/10; B60W 2720/103; B60W 2720/106; B60W 2720/12; B60W 2720/125; B60W 2720/14; B60W 2720/16; B60W 2720/18; B60W 2720/20; B60W 2540/00; B60W 2540/16; B60W 2540/165; B60W 2540/18; B60W 2520/06; B60W 2520/10; B60W 2520/105; B60W 2520/12; B60W 2520/125; B60W 2520/14; B60W 2520/16; B60W 2520/18; B60W 2520/20; G05D 1/00; G05D 1/0083; G05D 1/0858; G05D 3/00; G05D 3/12;
(Continued)

(56) References Cited

U.S. PATENT DOCUMENTS

| | | | |
|---|---|---|---|
| 4,371,938 A | 2/1983 | Wright et al. | |
| 4,460,858 A * | 7/1984 | Ashland | ............... G05D 1/0061 244/197 |

(Continued)

FOREIGN PATENT DOCUMENTS

| | | |
|---|---|---|
| CN | 101464692 A | 6/2009 |
| CN | 101939187 A | 1/2011 |

(Continued)

*Primary Examiner* — Anthony R Jimenez
(74) *Attorney, Agent, or Firm* — Slater Matsil, LLP

(57) ABSTRACT

In accordance with an embodiment, a method of operating an aircraft includes operating the aircraft in a first mode including determining an attitude based on a pilot stick signal, where a translational speed or an attitude of the aircraft is proportional to an amplitude of the pilot stick signal in the first mode; transitioning from the first mode to a second mode when a velocity of the aircraft exceeds a first velocity threshold; and operating the aircraft in the second mode where the output of the rate controller is proportional to the amplitude of the pilot stick signal.

27 Claims, 15 Drawing Sheets

Related U.S. Application Data which is a continuation-in-part of application No. 15/446,911, filed on Mar. 1, 2017, now Pat. No. 10,481,615.

(58) Field of Classification Search
CPC .. G05D 3/14; G05D 3/18; G05D 3/20; G05D 1/0061; G05D 1/0055; G05D 1/0066; B64C 13/00; B64C 13/28; B64C 13/50; B64C 13/503; B64C 13/02; B64C 13/04; B64C 13/042; B64C 13/0421; B64C 13/0423; B64C 13/0425; B64C 13/12; B64C 13/14; B64C 13/16; B60L 2250/00; B60L 2250/243; B60L 2200/00; B60L 2250/10
USPC .......................................................... 701/3
See application file for complete search history.

(56) References Cited

U.S. PATENT DOCUMENTS

| | | | |
|---|---|---|---|
| 5,001,646 A | 3/1991 | Caldwell et al. | |
| 5,238,203 A * | 8/1993 | Skonieczny | G05D 1/0858 244/17.13 |
| 5,263,662 A | 11/1993 | Fowler et al. | |
| 6,062,513 A | 5/2000 | Lambregts | |
| 6,301,534 B1 * | 10/2001 | McDermott, Jr. | B62D 5/001 701/41 |
| 6,885,917 B2 * | 4/2005 | Osder | B64C 27/18 244/10 |
| 9,102,400 B2 * | 8/2015 | Cherepinsky | B64C 13/503 |
| 9,540,096 B2 * | 1/2017 | Lin | B64C 19/00 |
| 9,690,291 B2 | 6/2017 | Ouellette et al. | |
| 9,971,354 B2 | 5/2018 | Cherepinsky et al. | |
| 2004/0118973 A1 | 6/2004 | Malmuth et al. | |
| 2012/0253561 A1 | 10/2012 | Ellis et al. | |
| 2013/0138270 A1 | 5/2013 | Christensen et al. | |

FOREIGN PATENT DOCUMENTS

| | | |
|---|---|---|
| CN | 102712359 A | 10/2012 |
| CN | 103389732 A | 11/2013 |
| CN | 103466084 A | 12/2013 |
| CN | 104155988 A | 11/2014 |
| CN | 105573333 A | 5/2016 |
| GB | 2050980 A | 1/1981 |
| KR | 101682423 B1 | 12/2016 |
| WO | 2013120031 A1 | 8/2013 |

\* cited by examiner

FIG. 3
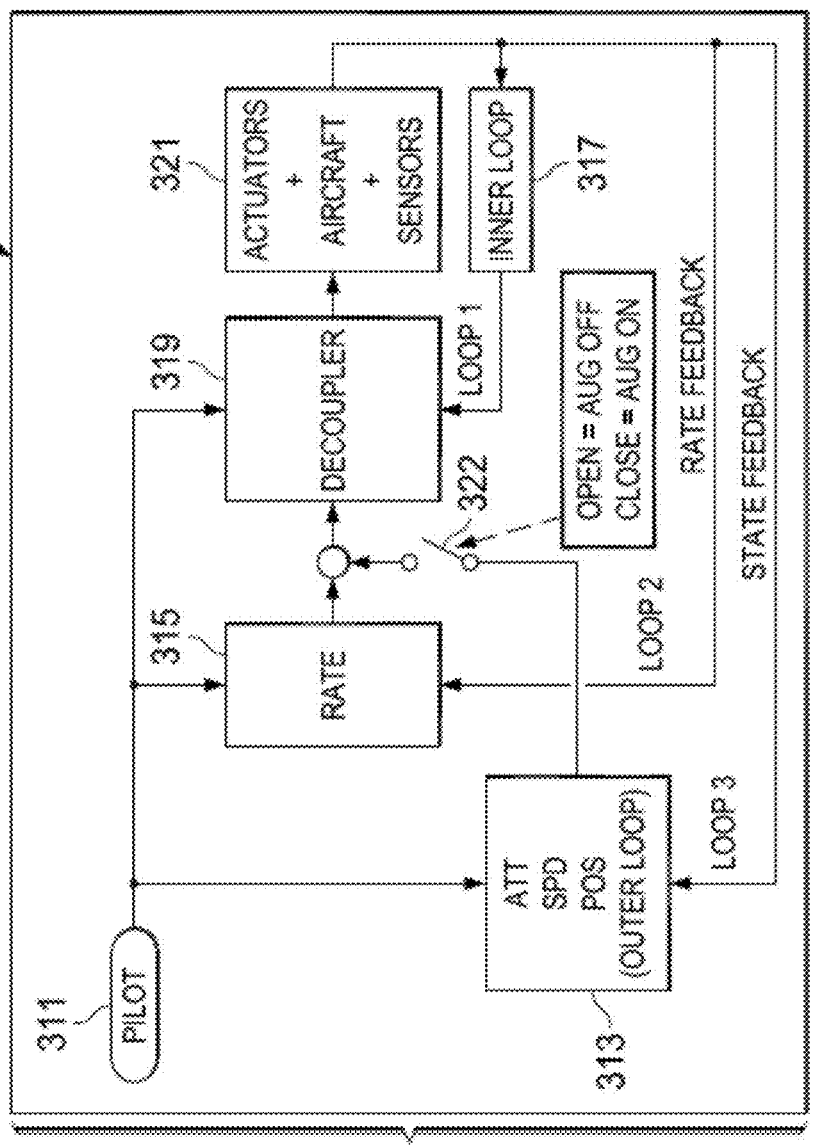
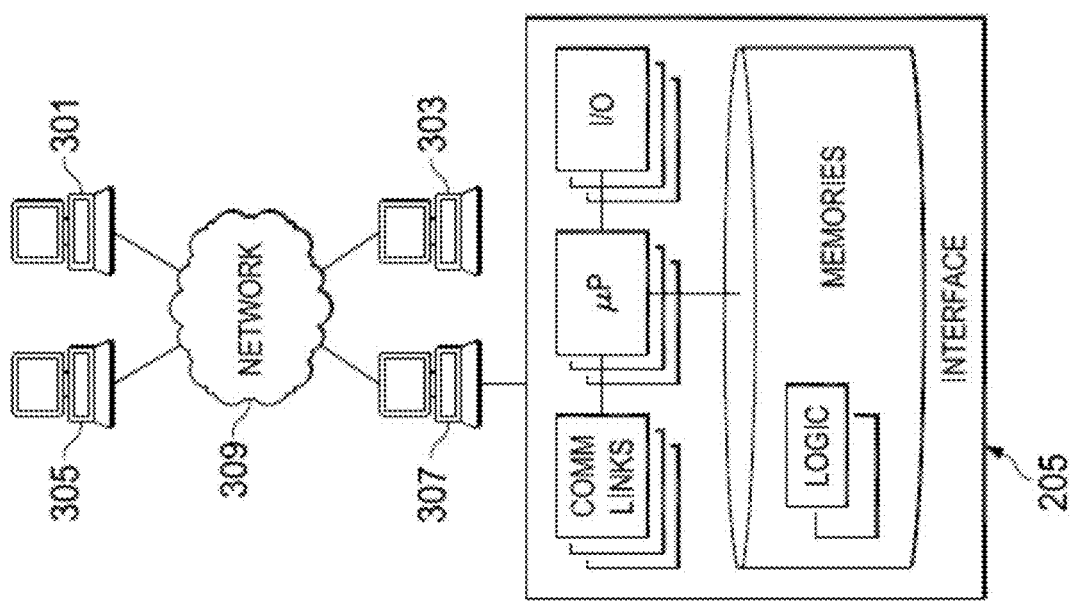

| Mode | Description |
| --- | --- |
| TRC | Translational Rate Command |
| ACRTT | Attitude Command Return to Trim Speed |
| ACSH | Attitude Command Speed Hold |
| ACAH | Attitude Command Attitude Hold |
| RCRTT | Rate Command Return to Trim Speed |
| RCSH | Rate Command Speed Hold |
| RCAH | Rate Command Attitude Hold |

*Fig. 8A*

| | X KTS and BELOW | BEYOND X KTS | Attitude to Rate Transition |
| --- | --- | --- | --- |
| 1 | TRC | ACRTT | |
| 2 | TRC | ACSH | |
| 3 | TRC | ACAH | |
| 4 | TRC | RCRTT | X |
| 5 | TRC | RCSH | X |
| 6 | TRC | RCAH | X |
| 7 | ACRTT | ACSH | |
| 8 | ACRTT | ACAH | |
| 9 | ACRTT | RCRTT | X |
| 10 | ACRTT | RCSH | X |
| 11 | ACRTT | RCAH | X |
| 12 | ACSH | ACAH | |
| 13 | ACSH | RCRTT | X |
| 14 | ACSH | RCSH | X |
| 15 | ACSH | RCAH | X |
| 16 | ACAH | RCRTT | X |
| 17 | ACAH | RCSH | X |
| 18 | ACAH | RCAH | X |
| 19 | RCRTT | RCSH | X |
| 20 | RCRTT | RCAH | X |
| 21 | RCSH | RCAH | X |

*Fig. 8B*

AIRCRAFT CONTROL MODE TRANSITION SMOOTHING

This application is a continuation in part of U.S. patent application Ser. No. 14/108,479, filed on Aug. 22, 2018, and U.S. patent application Ser. No. 15/446,911, filed on Mar. 1, 2017 which applications are hereby incorporated herein by reference in their entirety.

TECHNICAL FIELD

The present invention relates generally to a system and method for a flight control, and, in particular embodiments, to a system and method for control mode transition smoothing for an aircraft.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower due, in part, to the increased complexity of controlling and stabilizing a rotorcraft. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he flies.

One challenge in the design of fly-by-wire systems for rotorcraft is transitioning between different modes of operation that utilize different control laws or algorithms. In some circumstances, the change in control algorithm may result in a physical transient during operation of the rotorcraft that might be physically discernable as a bump or jolt by the pilot or passengers.

SUMMARY

In accordance with an embodiment, a method of operating an aircraft includes operating the aircraft in a first mode including determining an attitude based on a pilot stick signal generated by a pilot stick assembly, determining a first rate command based on the determined attitude using an attitude controller, determining an actuator command based on the determined first rate command, determining the actuator command including using a rate controller having an integrator, and providing an output of the rate controller to an actuator, where a translational speed or an attitude of the aircraft is proportional to an amplitude of the pilot stick signal in the first mode; transitioning from the first mode to a second mode when a velocity of the aircraft exceeds a first velocity threshold, transitioning including fading out a gain of the attitude controller over a first period of time; and operating the aircraft in the second mode including providing the pilot stick signal to an input of the rate controller, where the output of the rate controller is proportional to the amplitude of the pilot stick signal.

In accordance with another embodiment, a flight control system for an aircraft includes: a processor and a non-transitory computer readable storage medium with an executable program stored thereon, the executable program including instructions to: receive a pilot control signal via a first interface of the processor; in a first mode determine an attitude based on the received pilot control signal, determine a first rate command based on the determined attitude using an attitude controller, determine an actuator command based on the determined first rate command, determining the actuator command including executing a rate controller that has an integrator, and providing an output of the rate controller to an actuator via a second interface of the processor, where a state of the aircraft corresponding to the attitude is configured to be proportional to the received pilot control signal; and transitioning from the first mode to a second mode when a first condition of the aircraft crosses a first predetermined threshold, transitioning including fading out a gain of the attitude controller over a first period of time, and decreasing a value of the integrator over a second period of time; and in the second mode, providing the pilot control signal to an input of the rate controller, where the output of the rate controller is proportional to the received pilot control signal.

In accordance with a further embodiment, a rotorcraft includes: a body; a power train coupled to the body and including a power source and a drive shaft coupled to the power source; a rotor system coupled to the power train and including a plurality of rotor blades; a flight control system operable to change at least one operating condition of the rotor system; a pilot control assembly configured to receive commands from a pilot, where the flight control system is a fly-by-wire flight control system in electrical communication with the pilot control assembly; and a flight control computer in electrical communication between the flight control system and the pilot control assembly, the flight control computer configured to: receive, from the pilot control assembly a pilot command to change a first flight characteristic, when a velocity of the rotorcraft is less than a first velocity threshold, interpret the first flight characteristic as a requested translational speed or as a requested attitude in a first mode, determine a controlled attitude based on the requested translational speed or the requested attitude using an attitude controller, determining a first rate command based on the determined attitude, and determine an actuator command based on the determined rate command using a rate controller; when the velocity of the rotorcraft is greater than a second velocity threshold, interpret the first flight characteristic as a rate in a second mode by providing the pilot command to the rate controller, and when the velocity of the rotorcraft increases past the second velocity threshold, fade out a gain of the attitude controller, and successively decrease a value of an integrator in the rate controller.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a block diagram of an embodiment flight control system;

FIG. 8A is a table illustrating embodiment flight modes; and FIG. 8B is a table illustrating embodiment mode transitions;

Figure 1:
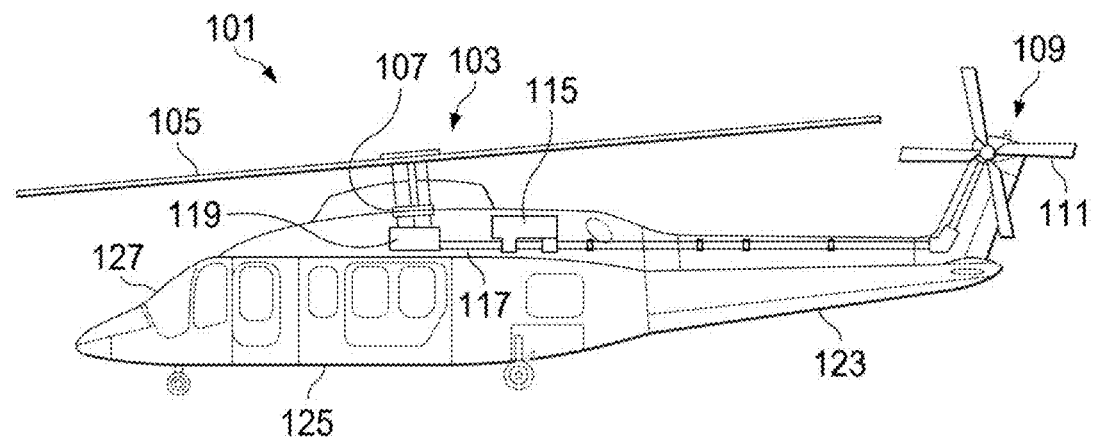
FIG. 1 illustrates an embodiment rotorcraft.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the present disclosure will be described with respect to preferred embodiments in a specific context, namely a system and method for smoothing a transition between a translational rate command (TRC) mode to a rate mode in a rotorcraft.

Embodiments of the present disclosure may also be applied to other control mode transitions in the operation and control of a rotorcraft.

In an embodiment of the present invention, a forward displacement on the cyclic controller or pilot stick of the rotorcraft is interpreted in one of two ways. When the speed of the rotorcraft is 10 kts or less and the speed command by displacement on the cyclic controller is less than 10 kts, the displacement on the cyclic controller is interpreted as a speed command. For example, ½ inch of stick displacement may correspond to a speed of 2 kts; 1" of stick displacement may correspond to a speed of 4 kts, and so on. However, when the speed of the rotorcraft is greater than 10 kts or the speed command by displacement on the cyclic controller is greater than 10 kts, displacement on the cyclic controller is interpreted as a rate command. For example, ½" of stick displacement may correspond to a rate of 10° per second; 1" of stick displacement may correspond to a rate of 20° per second, and so on. By automatically switching between the two different modes of operation based on the speed of the rotorcraft, pilot workload may be reduced.

In some circumstances, however, the rotorcraft may undergo a physical transient during the transition between the speed control mode at low speeds and the rate control mode at higher speeds. This physical transient may be caused by sudden changes in flight control algorithms and abrupt shifts in control signals. In embodiments of the present invention, the transition between speed control and rate control is made smoother by controlling the gains and the signal path structure of an attitude controller used during the speed control mode. In one example, the overall gain of the attitude controller is reduced using a fader. During this time, a proportional path in the controller is maintained while a value of an integrator is decremented to zero. Also during this time the gain of a control path between the cyclic controller and the rate control block is increased using a fader. By maintaining a proportional path in the attitude controller, decrementing the integrator to zero, fading out the overall gain of the attitude controller and fading in the gain of the control path between the cyclic controller and the rate control block, a smooth transition between speed control mode and rate control mode may be made more smooth. It should be understood that embodiments of the present invention may be applied to other control signals and control paths of the rotorcraft.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
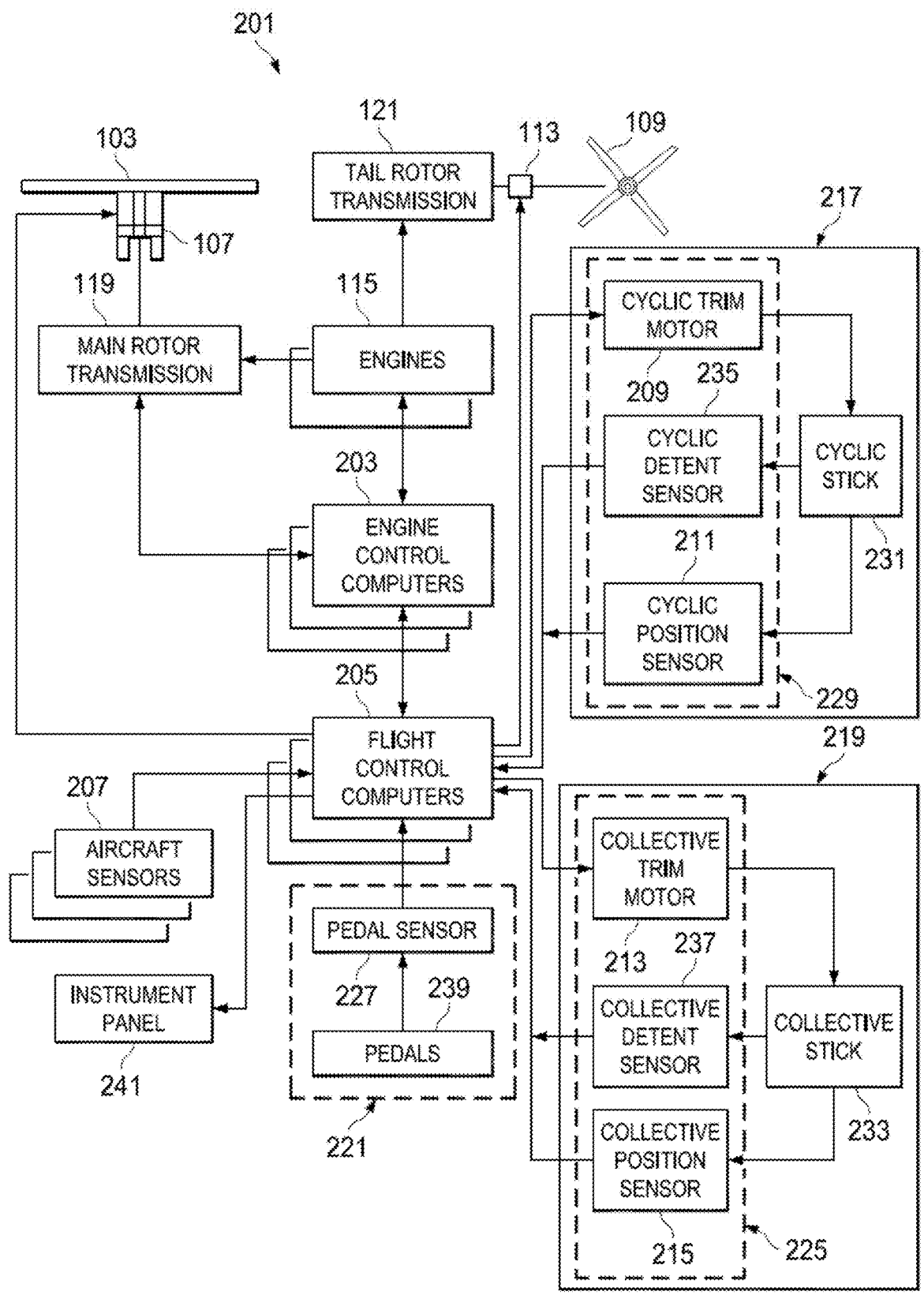
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is either resting or moving the cyclic stick 231, while the collective control assembly 219 has a collective detent sensor 237 that determines whether the pilot is either holding or moving the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Moving now to the operational aspects of flight control system 201, FIG. 3 illustrates in a highly schematic fashion, a manner in which flight control system 201 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Figure 4:
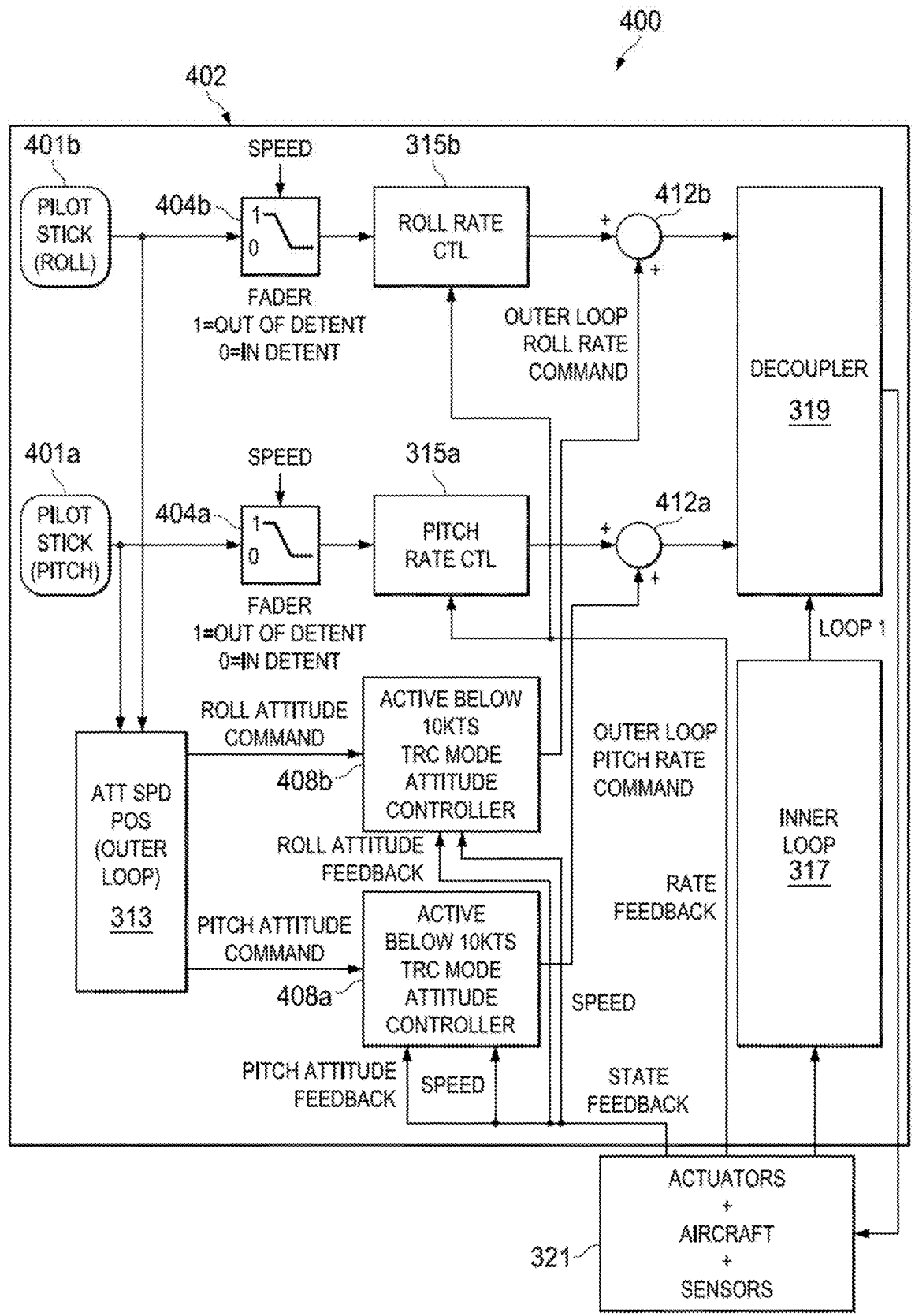
FIG. 4 illustrates a block diagram of a further embodiment flight control system.

FIG. 4 illustrates a flight control system 400 according to an embodiment of the present invention. Pilot stick pitch block 401a and pilot stick roll block 401b represent, for example, the respective pitch and roll commands emanating from cyclic controller 217 of the rotorcraft. As shown, pilot stick blocks 401a and 401b interface to flight controller 402. In various embodiments, flight controller 402 is implemented using a flight computer, or other processing hardware. Flight controller 402 also interfaces with and controls aircraft equipment 321 representing various actuators, sensors, and the physical body of the rotorcraft. In various embodiments, flight controller 402 controls aircraft equipment 321 using three loops: an inner loop, a rate feedback loop and a state feedback loop: the inner loop stabilizes the dynamics of the rotorcraft, the rate loop controls the angular rates of the rotorcraft, and the outer loop provides control signals to the inner loop and/or rate loops to effect a desired attitude, speed and position of the rotorcraft. In some embodiments, the outer loop supports and provides flight augmentation or auto-pilot functionality and may be manually or automatically disabled based on flight and system conditions. The inner loop and rate feedback loops, on the other hand, remain operational to provide stability to the rotorcraft.

For purposes of illustration, flight controller 402 is illustrated with respect to the general control blocks that affect the rotational rate of an embodiment rotorcraft, namely the control blocks affecting the roll rate and the pitch rate of the rotorcraft. It should be understood that flight controller 402 may also include other controllers and control paths that affect the yaw and other states of the rotorcraft in addition to the pitch rate and roll rate. As shown, the inner stabilization loop is controlled by inner loop controller 317, the rate loop is controlled by pitch rate controller 315a and roll rate controller 315b, and the outer loop is controlled by outer loop controller 313 in conjunction with TRC mode attitude controllers 408a and 408b that provide TRC mode pitch and roll control, respectively, during embodiment TRC modes.

Each of inner loop controller 317, decoupler 319 and rate controller 315 may be implemented using flight control algorithms known in the art. Inner loop controller 317 receives sensor feedback from sensors such as gyroscopes and accelerometers within the rotorcraft and provides control signals to various actuators, such as swashplate 107 to stabilize the rotorcraft. Rate controller 315 receives rate feedback from rate gyroscopes on all axes and provides a rate command signal to inner loop controller 317 based on the rate feedback and the position of pilot stick pitch block 401a and pilot stick roll block 401b in some modes of operation. Decoupler 319 receives the various rate commands and approximately decouples all 4-axes (pitch, roll, yaw, and vertical) such that, for example, a forward longitudinal stick input does not require the pilot to push the stick diagonally.

Outer loop controller 313 receives state feedback from the sensors of aircraft equipment 321. This state feedback may include, for example, speed, position and attitude. In a translational rate commend (TRC) mode, outer loop controller 313 receives a command from the pilot stick represented by pilot stick pitch block 401a and pilot stick roll block 401b, determines a corresponding translational speed based on the pilot stick command, and determines corresponding pitch and roll attitude commands based on the determined translational speed. The translational speed may include a forward component based on commands from pilot stick pitch block 401a and a lateral component based on commands from pilot stick roll block 401b. In some embodiments, the corresponding translational speed is determined by multiplying the pilot stick command, or a vector sum of the pitch and roll pilot stick commands with a scale factor and/or by using a lookup table. The translational speed may be calculated using a vector sum as follows:

$$V_T = k\sqrt{S_{LON}^2 + S_{LAT}^2},$$

where $V_T$ is the translational speed, k is a scale factor, $S_{LON}$ is the pilot stick pitch command, and $S_{LAT}$ is the pilot stick roll command. In some embodiments, the vector sum is not used and the translational speed is based on the forward speed and/or the lateral speed.

The pitch and roll attitude commands may be determined from the translational speed using a speed control loop. During the TRC mode, TRC mode attitude controllers 408a and 408b individually calculate pitch and roll attitude errors by subtracting the pitch attitude feedback from the pitch attitude command and by subtracting the roll attitude feedback from the roll attitude command. In various embodiments, the pitch and roll attitude feedback is a component of the state feedback. TRC mode attitude controller 408a applies a dynamic control algorithm to the pitch attitude error to produce an outer loop pitch rate command, and TRC mode attitude controller 408b applies a dynamic control algorithm to the roll attitude error to produce an outer loop roll rate command. These outer loop rate commands are applied to decoupler 319 via summing blocks 412a and 412b. While the embodiment of FIG. 4 shows TRC mode attitude controllers 408a and 408b used to provide TRC mode control to both the pitch and roll channels, it should be understood that in alternative embodiments, TRC mode control may be applied to a single attitude channel, such as the pitch channel for speed control in the forward direction.

In various embodiments of the present invention, the TRC mode is automatically selected based on the velocity or ground speed of the rotorcraft. This ground speed may be measured, for example, using GPS or an optical sensing system such as laser-based sensing system. In one example, the TRC mode is selected when the ground speed is less than 10 kts, in which a fixed offset of the pilot stick effects a constant translation. When the ground speed is 10 kts and greater, the pilot stick effects a rate in a rate control mode. In the embodiment of FIG. 4, the TRC mode is activated by enabling TRC mode attitude controller 408a and 408b when the ground speed is less than 10 kts and decoupling the pilot stick pitch block 401a from pitch rate controller 315a via fader 404a and optionally decoupling the pilot stick roll block 401b from the roll rate controller 315b via fader 404b. It should be appreciated that the 10 kts threshold is just one example of many possible groundspeed thresholds. In alternative embodiments, other threshold values may be used. Likewise, the rate control mode is selected by coupling pilot stick pitch block 401a to pitch rate controller 315a via fader 404a, and by coupling pilot stick roll block 401b to roll rate controller 315b via fader 404b. In some embodiments, pilot stick blocks 401a and 401b are coupled to rate controllers 315a and 315b when the pilot stick is out of detent. In some embodiments, hysteresis may be applied to the ground speed threshold to prevent metastability of the control mode when the rotorcraft is flying at about 10 kts. In such an embodiment the ground speed threshold for transitioning from the TRC to the rate control mode is greater than the ground speed threshold for transitioning from the rate control mode to the TRC mode. For example, in one embodiment, TRC mode attitude controllers 408a and 408b are disabled when the pilot stick command is greater than 10 kts and then re-enabled when the pilot stick command is less than 3 kts. Alternatively, other hysteresis/threshold values may be used. Alternatively, a single threshold may be used without hysteresis. In various embodiments, the 10 kts and 3 kts speed thresholds may be applied to the forward speed, the lateral speed or a combination of the forward and lateral speed. Such a combination may be determined, for example, by calculating a vector sum of the forward speed and the lateral speed.

During operation, faders 404a and 404b provide a gain of one when the pilot stick is out of detent, and provides a gain of zero when the pilot stick is in detent. In various embodiments, the gain of faders 404a and 404b linearly increase or decrease between zero and one over a predetermined period of time or change in a predetermined speed range. This predetermined period of time is between about 1 s and about 10 s; however, fading times outside of this range may be implemented depending on the particular embodiment and its specifications. In further alternative embodiments, the gains of fader 404a and 404b may be different from one and zero. In some embodiments, pitch rate controllers 315a and roll rate controller 315b each a high-pass filter and/or washout filter coupled to their respective inputs. Thus, when the stick is out of detent and held at a steady displacement, the effective command produced by rate controller 315a and 315b as a result of a pilot stick command goes to zero. This high-pass filter or washout filter also prevents the output of TRC mode attitude controller 408a and 408b and the output of faders 404a and 404b from conflicting or "fighting" with each other when the pilot stick is out of detent.

Figure 5:
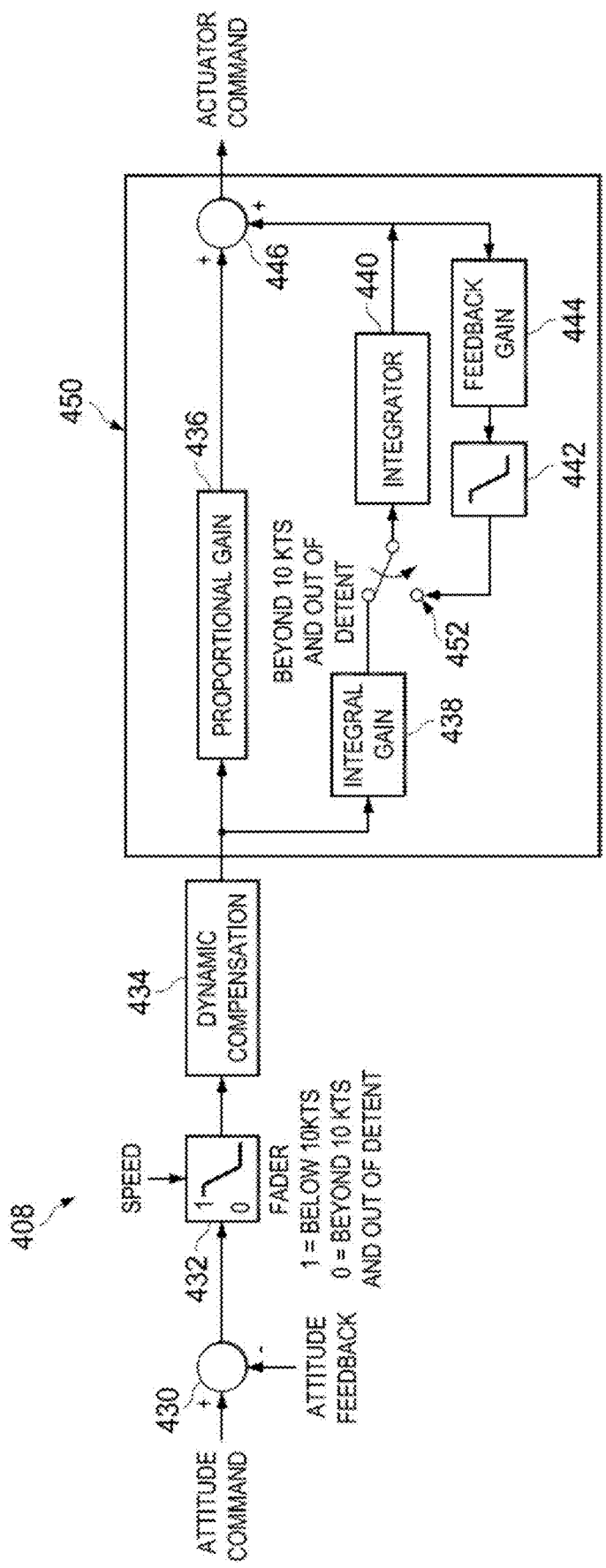
FIG. 5 illustrates a block diagram of an embodiment TRC mode attitude controller.

FIG. 5 illustrates a block diagram of TRC mode attitude controller 408 according to an embodiment of the present invention that may be used to implement TRC attitude controllers 408a and 408b illustrated in FIG. 4. As shown, TRC mode attitude controller 408 includes subtractor 430, fader 432, dynamic compensation block 434 and proportional-integral (PI) controller 450. Subtractor 430 produces an error signal based on the attitude command produced by the outer loop controller 313 (FIG. 4) and dynamic compensation block 434 compensates for the dynamics of the rotorcraft in order to improve stability and/or adjust the time response of the attitude loop. Dynamic compensation block 434 may include various control blocks known in the art including but not limited a PID controller and a lead-lag compensator.

PI controller 450 includes a proportional signal path that includes proportional gain block 436 coupled in parallel with an integral signal path that includes integral gain block 438 and integrator 440. In various embodiments, proportional gain block 436 and integral gain block 438 may be implemented, for example, by performing a multiplication or scaling operation. Integrator 440 may be implemented, for example, using an accumulator.

During TRC mode operation below the 10 kts speed threshold, fader 432 has a gain of one and the input of integrator 440 is coupled to the output of dynamic compensation block 434 via integral gain block 438. On the other hand, in the rate control mode in which the rotorcraft has a ground speed of 10 kts and above or the speed command by displacement on the cyclic controller is greater than 10 kts, fader 432 has a gain of zero, and the input of integrator 440 is coupled to its output via feedback gain block 444 and limiter 442, which effectively causes integrator 440 to decrement to zero or to a DC value representing zero output. The combination of zero fader gain and zero integrator output effectively disables TRC mode attitude controller 408. When the ground speed of the rotorcraft exceeds the 10 kts threshold, the gain of fader 432 linearly decreases to zero over a predetermined time period or a change in predetermined speed range and the input of the integrator is switched from the output of integral gain block 438 to the output of limiter 442. Once the input to integrator is switched to the output of limiter 442 via switch 452, the feedback action of the loop formed by integrator 440, feedback gain 444 and limiter 442 forces the output of integrator 440 decrement to zero over a period of time. Limiter 442 limits the rate at which integrator 440 is decremented such that the decay of integrator 440 has more of a ramp response instead of an exponential response for high integrator output values. Thus, in some embodiments, during a mode transition from TRC mode to rate control mode, the actuator command generated by summer 446 produces a gently decreasing or decaying signal from the forward path of the TRC mode attitude controller 408 due to fader 432 that is summed with a gently decreasing or decaying integrator value produced by integrator 440. At the same time as the output of the TRC mode attitude controller 408 is decaying, the pilot stick command to rate controller 315 is increasing due the increasing gain of fader 404. The net result of the decreasing output of the TRC mode attitude controller 408 and the increasing output of fader 404a or 404b to rate controller 315 is a smooth transition from TRC mode to a rate mode in some embodiments. In various embodiments, the time that it takes for faders 404a, 404b and 432 to change their gains may be the same or may be different from each other. In some embodiments, the fade-in and fade-out times of faders 404a, 404b and 432 may be the same or they may be different from each other depending on the change in speed.

Similarly, during a mode transition from rate mode to TRC mode, the pilot stick control signal produced by fader 404a or 404b decreases while the forward path of TRC mode attitude controller 408 increases due to the gain of fader 432 increasing and due to the integral path of PI controller 450 being activated by coupling the input of integrator 440 to the output of integral gain block 438 via switch 452.

In alternative embodiments of the present invention, integrator may be decremented in a different manner. For example, instead of using feedback gain 444 to decrease the output of the integrator, a fader may be coupled to the output of integrator 440 or may be coupled after summer 446.

In various embodiments, the transfer function and implementation of dynamic compensation block 434, the gains of fader 432, proportional gain 435, integral gain 438 and feedback gain 444, and the static and dynamic behavior of fader 432, limiter 442 and integrator 440 may be adjusted according to the specification and requirements of the rotorcraft and may have different implementations and values with regard to the roll, pitch and other attitude channels.

It should be understood that the transition between TRC and rate control mode with respect to the various rate commands is just one example of many possible system configurations that utilize embodiment mode switching systems and methods. In alternative embodiments, other control channels besides the pitch rate and roll rate control channel may be controlled. For example, embodiments of the present invention may be used to transition between attitude hold/command mode and a speed hold/command mode, transition between attitude hold/command mode and a position hold/command mode, transition between direct vertical collective control mode and an altitude hold/command mode, and/or transition between vertical speed hold/command mode and an altitude hold/command mode. It should be appreciated that these are only a few examples of many possible applications.

Figure 6:
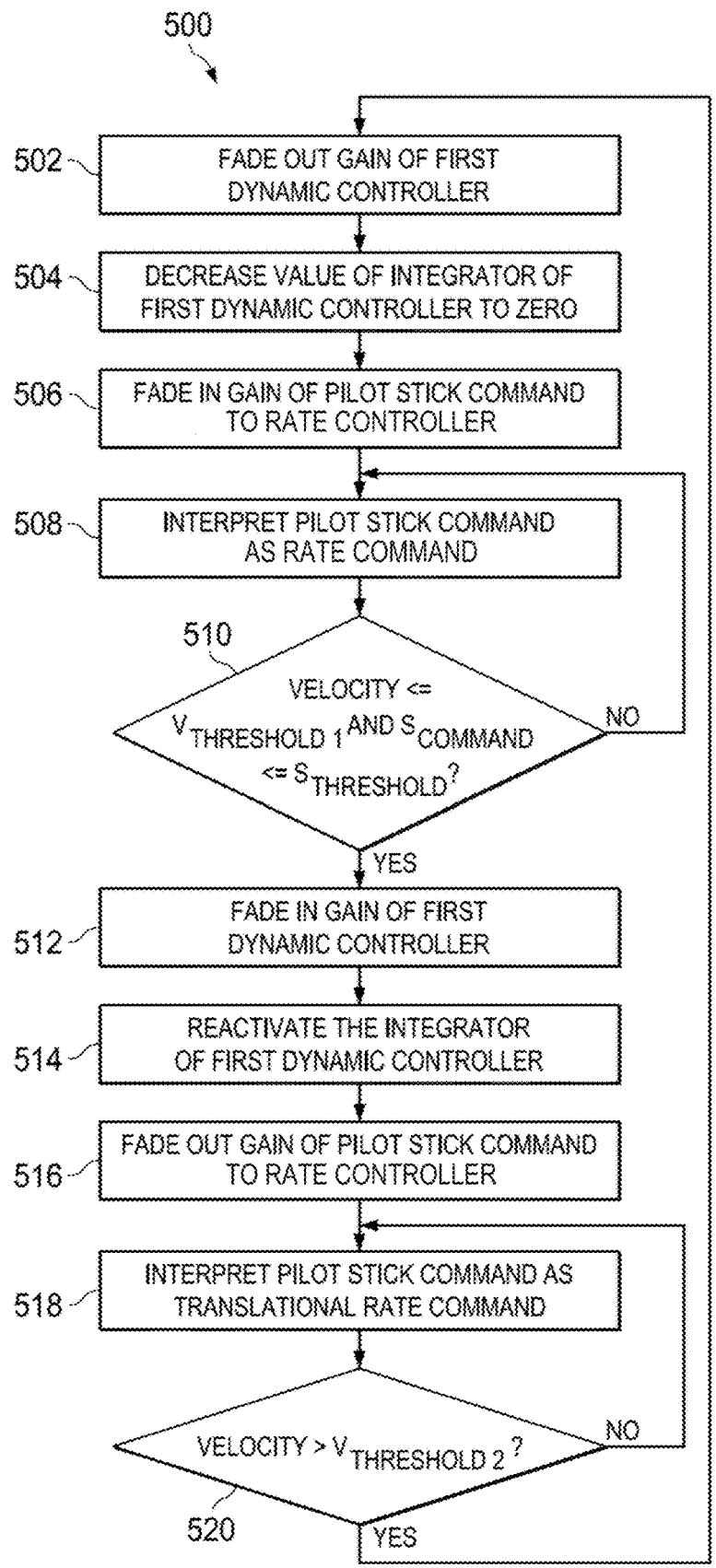
FIG. 6 illustrates a block diagram of an embodiment method.

FIG. 6 illustrates a block diagram of an embodiment method 500 of operating a rotorcraft that may be executed, for example, by a flight computer of a fly-by-wire system. In an embodiment, the pilot stick command of the cyclic control is interpreted as a translational rate command in step 518 in which the flight computer controls the rotorcraft to have a translational velocity that is proportional to a physical offset of the cyclic control. During step 518, a dynamic controller adjusts the attitude of the rotorcraft in order to maintain the desired translational velocity. When the velocity of the rotorcraft exceeds a threshold $V_{threshold2}$ according to step 520 or when the pilot stick command exceeds $V_{threshold2}$, the operational mode of the flight computer transitions to a rate command mode in step 508 in which the pilot stick command of the cyclic control is interpreted as a rate command. In this mode, the flight computer controls the rotorcraft to have a rate that is proportional to the physical offset of the cyclic control.

In order to provide a smooth transition from the translational command mode of step 518 to the rate command mode of step 508 and to reduce the occurrence of physical transients of the rotorcraft, steps 502, 504 and 506 are executed by the flight computer. In step 502, the gain of a first dynamic controller, which may be implemented, for example, as outer loop controller that provides a rate control in response to a desired attitude command, is faded out over first period of time. In step 504, a state of an integrator of the first dynamic controller is decreases over a second period of time, and in step 506 a gain of the pilot stick command is faded in over a third period of time. In some embodiments, steps 502, 504 and 506 occur concurrently such that the gain of the first dynamic controller is reduced at the same time as the gain of the pilot stick command to the rate controller is faded in. During this time, the value of the integrator is reduced. In some embodiments, the value of the integrator is decremented by disconnecting the integrator from the input of the first dynamic controller and coupling the input of the integrator to its output. The input and/or output value of the integrator may be limited while the integrator value is reduced in order to increase the amount of time that it takes to decrement the value of the integrator to zero.

The rate command continues to be determined by the pilot stick command in step 508 until the velocity of the rotorcraft is less than or equal to threshold $V_{threshold1}$ and the stick command $S_{command}$ is less than an offset $S_{threshold}$ that represents a particular translational velocity command according to step 510. In some embodiments, $S_{threshold}$ may be set to a pilot stick offset that is less than 3 kts. Alternatively, other thresholds may be used. Once this condition is detected, the operational mode of the flight computer transitions to the translational rate command mode of step 518 via steps 512, 514 and 516. In some embodiments, threshold $V_{threshold1}$ is equal to threshold $V_{threshold2}$, while in other embodiments, $V_{threshold2}$ is greater threshold $V_{threshold1}$ in order to provide hysteresis. In step 512, the gain of the first dynamic controller is faded in, in step 514, the integrator of the first dynamic controller is reactivated by coupling its input to the signal path of the first dynamic controller, and in step 516 the gain of the pilot stick command to the rate controller is faded out. In some embodiments, steps 512, 514 and 516 occur concurrently such that the gain of the first dynamic controller is increased at the same time as the gain of the pilot stick command to the rate controller is reduced and at the same time the integrator of the first dynamic controller is reactivated.

Figure 7:
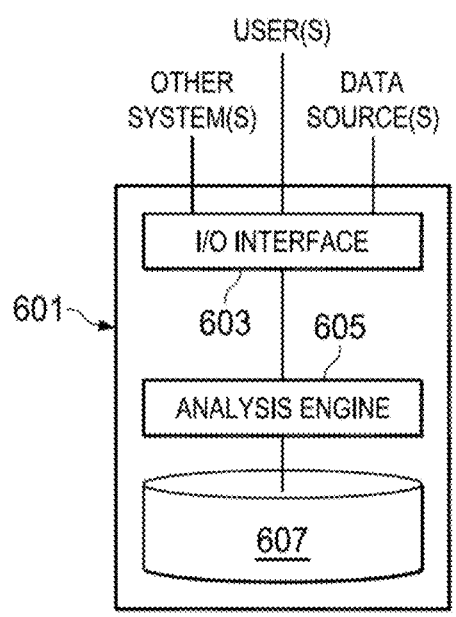
FIG. 7 illustrates an embodiment computer system.

FIG. 7 illustrates a computer system 601. The computer system 601 can be configured for performing one or more functions with regard to the operation of the flight control system 201 and methods 500 and 1100, as described herein. Further, any processing and analysis can be partly or fully performed by the computer system 601. The computer system 601 can be partly or fully integrated with other aircraft computer systems or can be partly or fully removed from the rotorcraft.

The computer system 601 can include an input/output (I/O) interface 603, an analysis engine 605, and a database 607. Alternative embodiments can combine or distribute the I/O interface 603, the analysis engine 605, and the database 607, as desired. Embodiments of the computer system 601 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the computer system 601. The I/O interface 603 can be configured for allowing one or more users to input information to the computer system 601 via any known input device. Examples can include a keyboard, mouse, touch screen, and/or any other desired input device. The I/O interface 603 can be configured for allowing one or more users to receive information output from the computer system 601 via any known output device. Examples can include a display monitor, a printer, cockpit display, and/or any other desired output device. The I/O interface 603 can be configured for allowing other systems to communicate with the computer system 601. For example, the I/O interface 603 can allow one or more remote computer(s) to access information, input information, and/or remotely instruct the computer system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the computer system 601 to perform one or more of the tasks described herein.

The database 607 provides persistent data storage for the computer system 601. Although the term "database" is primarily used, a memory or other suitable data storage arrangement may provide the functionality of the database 607. In alternative embodiments, the database 607 can be integral to or separate from the computer system 601 and can operate on one or more computers. The database 607 preferably provides non-volatile data storage for any information suitable to support the operation of the flight control system 201 and the method 500, including various types of data discussed further herein. The analysis engine 605 can include various combinations of one or more processors, memories, and software components.

Embodiment mode transition systems and methods can be applied to a wide variety of different flight mode transitions. For example, embodiments of the present invention can be applied to mode change from a flight mode that provides attitude and/or speed control to a flight mode that provides rate control and vice-versa. Examples of various flight modes are shown in the table of FIG. 8A, and various mode transitions between these modes are shown in the table of FIG. 8B. It should be understood that the modes and mode transitions detailed in FIGS. 8A and 8B are a non-exhaustive list of possible mode transitions. In alternative embodiment of the present invention, other modes and mode transition may be implemented depending on the particular system and its specifications.

As shown, in FIG. 8A, various flight modes may include the translational rate command mode (TRC) as discussed above, an attitude command return to trim speed (ACRTT) mode, an attitude command speed hold (ACSH) mode, an attitude command attitude hold (ACAH) mode, a rate command return to trip speed (RCRTT) mode, a rate command speed hold (RCSH) mode and a rate commend attitude hold (RCAH) mode.

Figure 9:
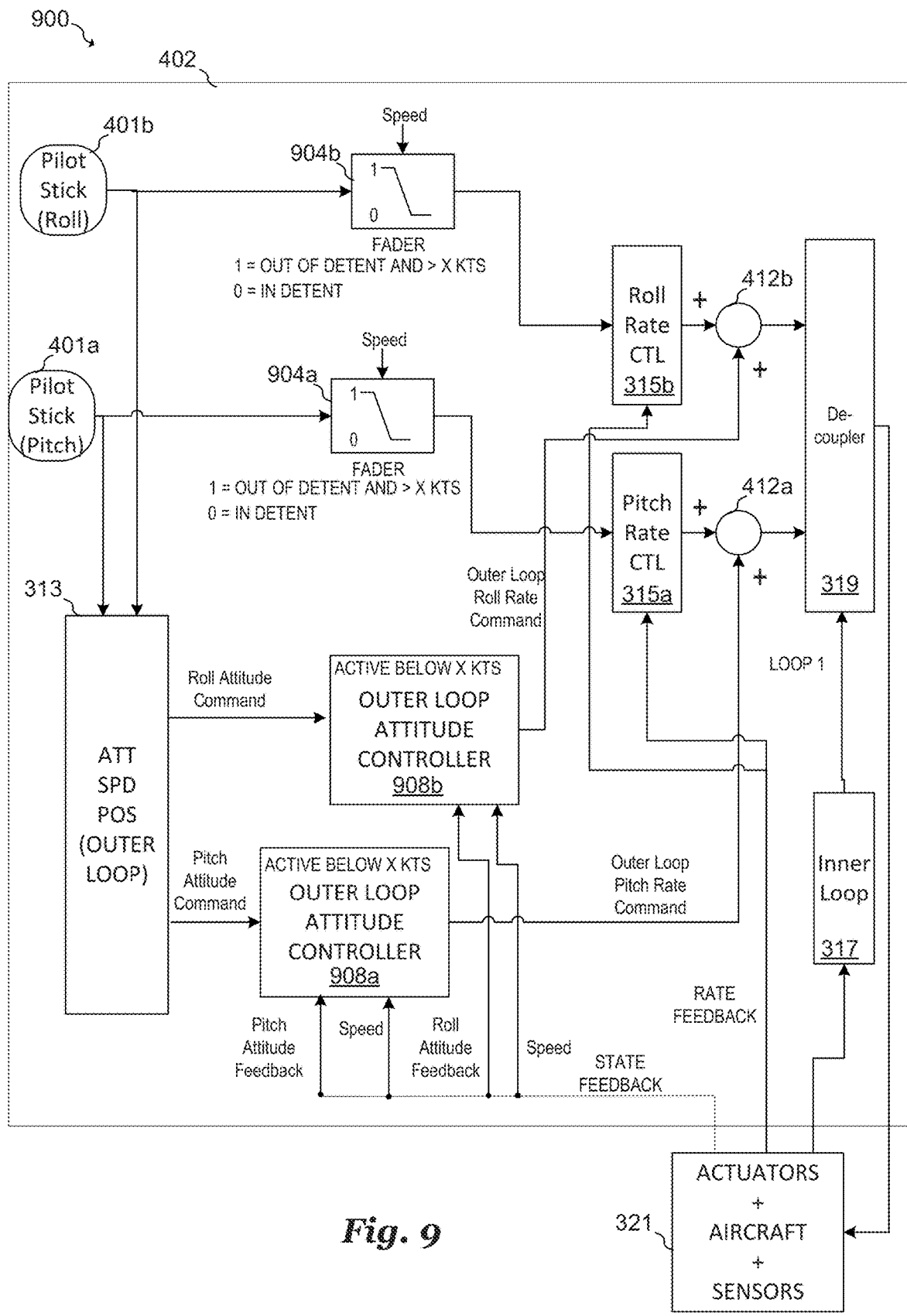
FIG. 9 illustrates a block diagram of an embodiment flight control system that supports multiple mode transitions.

FIG. 9 illustrates a flight control system 900 according to an embodiment of the present invention. Flight control system 900 is similar to flight control system 400 described above with respect to FIG. 4, with the exception that TRC mode attitude controllers 408a and 408b are replaced by outer loop attitude controllers 908a and 908b. During modes in which outer loop 313 issues roll attitude commands and pitch attitude commands, outer loop attitude controller 908a applies a dynamic control algorithm to the pitch attitude error to produce an outer loop pitch rate command, and outer loop attitude controller 408b applies a dynamic control algorithm to the roll attitude error to produce an outer loop roll rate command. These outer loop rate commands are applied to decoupler 319 via summing blocks 412a and 412b. In various embodiments, outer loop attitude controllers 908a and 908b are active in the TRC, ACRTT, ACSH and ACAH mentioned above.

In the TRC mode, the outer loop controller 313 receives a command from the pilot stick represented by pilot stick pitch block 401a and pilot stick roll block 401b, determines a corresponding translational speed based on the pilot stick command, and determines corresponding pitch and roll attitude commands based on the determined translational speed. Outer loop attitude controllers 908a and 908b produce outer loop pitch rate and roll rate commands based on the pitch and roll attitude commands produced by outer loop 313.

In the ACRTT mode, the pilot stick controls the attitude of the rotorcraft when the pilot stick is out of detent. When the pilot stick is released and goes back into detent, the flight control system maintains the rotorcraft at a predetermined trim speed. During the ACRTT mode, the outer loop controller 313 receives a command from the pilot stick represented by pilot stick pitch block 401a and pilot stick roll block 401b when the pilot stick is out of detent, determines a corresponding attitude based on the pilot stick command, and determines corresponding pitch and roll attitude commands based on the determined commanded attitude. Outer loop attitude controllers 908a and 908b produce outer loop pitch rate and roll rate commands based on the pitch and roll attitude commands produced by outer loop 313 to effect the commanded attitude.

When the pilot stick is in detent in the ACRTT mode, outer loop controller 313 determines pitch and roll attitude commands that correspond to the trim speed. In some embodiments, this trim speed is the speed of the rotorcraft prior to the pilot stick being taken out of detent. Outer loop attitude controllers 908a and 908b produce outer loop pitch rate and roll rate commands based on the pitch and roll attitude commands produced by outer loop 313 to effect the determined trim speed.

In the ACSH mode, the pilot stick controls the attitude of the rotorcraft when the pilot stick is out of detent. When the pilot stick is released and goes back into detent, the flight control system maintains the speed at which the rotorcraft was travelling immediately prior to the pilot stick going back into detent. During the ACSH mode, the outer loop controller 313 receives a command from the pilot stick represented by pilot stick pitch block 401a and pilot stick roll block 401b when the pilot stick is out of detent, determines a corresponding attitude based on the pilot stick command, and determines corresponding pitch and roll attitude commands based on the determined commanded attitude. Outer loop attitude controllers 908a and 908b produce outer loop pitch rate and roll rate commands based on the pitch and roll attitude commands produced by outer loop 313 to effect the commanded attitude.

When the pilot stick is released and falls back into detent in the ACSH mode, the outer loop continues to issue pitch and roll attitude commands to maintain the speed at which the rotorcraft was travelling immediately prior to the pilot stick being released.

In the ACAH mode, the pilot stick controls the attitude of the rotorcraft when the pilot stick is out of detent. When the pilot stick is released and goes back into detent, the flight control system brings the aircraft back to level attitude. During the ACAH mode, the outer loop controller 313 receives a command from the pilot stick represented by pilot stick pitch block 401a and pilot stick roll block 401b when the pilot stick is out of detent, determines a corresponding attitude based on the pilot stick command, and determines corresponding pitch and roll attitude commands based on the determined commanded attitude. Outer loop attitude controllers 908a and 908b produce outer loop pitch rate and roll rate commands based on the pitch and roll attitude commands produced by outer loop 313 to effect the commanded attitude.

When the pilot stick is released and falls back into detent in the ACRTT mode, the outer loop continues to issue pitch and roll attitude commands to maintain the speed the rotorcraft was travelling immediately prior to the pilot stick being released.

In the RCRTT mode, the pilot stick controls the rate of the rotorcraft when the pilot stick is out of detent. When the pilot stick is released and goes back into detent, the flight control system maintains the rotorcraft at a predetermined trim speed. During the RCRTT mode, pitch rate controller 315a and roll rate controller 315b receives commands represented by pilot stick pitch block 401a and pilot stick roll block 401b when the pilot stick is out of detent, while directly affecting the rate of the rotorcraft.

When the pilot stick is in detent in the RCRTT mode, outer loop controller 313 determines pitch and roll attitude commands that correspond to the predetermined trim speed. In some embodiments, the predetermined trim speed is the speed of the rotorcraft prior to the pilot stick being taken out of detent. Outer loop attitude controllers 908a and 908b produce outer loop pitch rate and roll rate commands based on the pitch and roll attitude commands produced by outer loop controller 313.

In the RCSH mode, the pilot stick controls the rate of the rotorcraft when the pilot stick is out of detent. When the pilot stick is released and goes back into detent, the flight control system maintains the speed at which the rotorcraft was travelling immediately prior to the pilot stick going back into detent. During the RCSH mode, pitch rate controller 315a and roll rate controller 315b, receives commands represented by pilot stick pitch block 401a and pilot stick roll block 401b when the pilot stick is out of detent, while directly affecting the rate of the rotorcraft.

When the pilot stick goes into detent in the RCSH mode, outer loop controller 313 determines pitch and roll attitude commands that correspond to speed at which the rotorcraft was travelling immediately prior to the pilot stick being released. Outer loop attitude controllers 908a and 908b produce outer loop pitch rate and roll rate commands based on the pitch and roll attitude commands produced by outer loop controller 313.

In the RCAH mode, the pilot stick controls the rate of the rotorcraft when the pilot stick is out of detent. When the pilot stick is released and goes back into detent, the flight control system maintains the attitude of the rotorcraft immediately prior to the pilot stick going back into detent. During the RCAH mode, pitch rate controller 315a and roll rate controller 315b receives commands represented by pilot stick pitch block 401a and pilot stick roll block 401b when the pilot stick is out of detent, while directly affect the rate of the rotorcraft.

When the pilot stick goes into detent in the RCAH mode, outer loop controller 313 determines pitch and roll attitude commands that correspond to the attitude of the rotorcraft immediately prior to the pilot stick going back in detent. Outer loop attitude controllers 908a and 908b produce outer loop pitch rate and roll rate commands based on the pitch and roll attitude commands produced by outer loop controller 313.

Embodiment fading techniques may be applied to transitions between pilot stick effected rate control and outer loop effected attitude/speed control. These transitions may occur both within the same control mode or may occur between control modes. For example, in some embodiments, when the pilot stick goes into detent for the RCRTT, RCSH, and RCAH modes, outer loop pitch and roll rate commands generated by pilot sticks 401a and 401b are faded out using faders 904a and 904b, while the outer loop pitch rate and roll rate commands are faded in using outer loop controllers 908a and 908b using embodiment systems and methods described herein. On the other hand, when the pilot stick goes out of detent, outer loop pitch and roll rate commands generated by pilot sticks 401a and 401b are faded in using faders 904a and 904b, while the outer loop pitch rate and roll rate commands are faded out using outer loop controllers 908a and 908b as using embodiment systems and methods described herein.

FIG. 8B illustrates a table showing various possible transitions that may occur between the various embodiment control modes described above with respect to FIG. 8A. In various embodiments, the flight control system may be configured to transition between control modes depending on the speed at which the rotorcraft is traveling. Alternatively, other criteria may be used in conjunction with or instead of the speed of the rotorcraft. For example, the pilot stick position, stick rate, or logic toggle switch may be used to determine the present control mode. It should also be understood that the 21 mode changes scenarios depicted in FIG. 8B represents a non-exhaustive set of examples. In alternative embodiments, other mode change scenarios that are not depicted in FIG. 8B may be implemented according to embodiments of the present invention.

The table of FIG. 8A categories each mode change scenario in terms of a flight control mode that is active at speeds of X kts and below, a corresponding flight control mode that is active at speeds of beyond X kts. The speed at which the mode transitions occurs may be selected according to the particular rotorcraft and its specifications. In one example, the transition speed is 10 kts.

An "X" in the column entitled "Attitude to Rate Transition" indicates that embodiment fading systems and methods are used to fade in and out pilot-stick based attitude commands and outer loop generated attitude commands using embodiment systems and methods described herein. For example, since the TRC mode relies on outer loop controller 313 to generate attitude commands, while the RCRTT mode relies on pilot stick input to generate pitch rate and roll rate commands, transitioning from the TRC mode to the RCRTT mode, embodiment mode transition techniques are used to fade out the pitch and roll rate commands generated by outer loop attitude controllers 908a and 908b and fade in the pilot stick commands via faders 904a and 904b. When transitioning from the RCRTT mode back to the TRC mode, embodiment mode transition techniques are used to fade in the pitch and roll rate commands generated by outer loop attitude controllers 908a and 908b and fade out the pilot stick commands via faders 904a and 904b.

As shown in the table of FIG. 8B, mode transitions between TRC and RCRTT; TRC and RCSH; TRC and RCAH; ACRTT and RCRTT; ACRTT and RCRTT; ACRTT and RCAH; ACSH and RCRTT; ACSH and RCSH; ACSH and RCAH; ACAH and RCRTT; ACAH and RCSH; ACAH and RCAH; RCRTT and RCSH; RCRTT and RCAH and RCSH and RCAH may use embodiment fading techniques. On the other hand, mode transitions between TRC and ACRTT; TRC and ACSH; TRC and ACAH; ACRTT and ACSH; ACRTT and ACAH; and ACSH and ACAH involve modes in which outer loop controller 313 generates pitch and roll attitude commands. Thus, the mode transition may be implemented in a way that does not involve fading between signal paths that include faders 904a and 904b and signal paths that include outer loop attitude controllers 908a and 908b.

Figure 10:
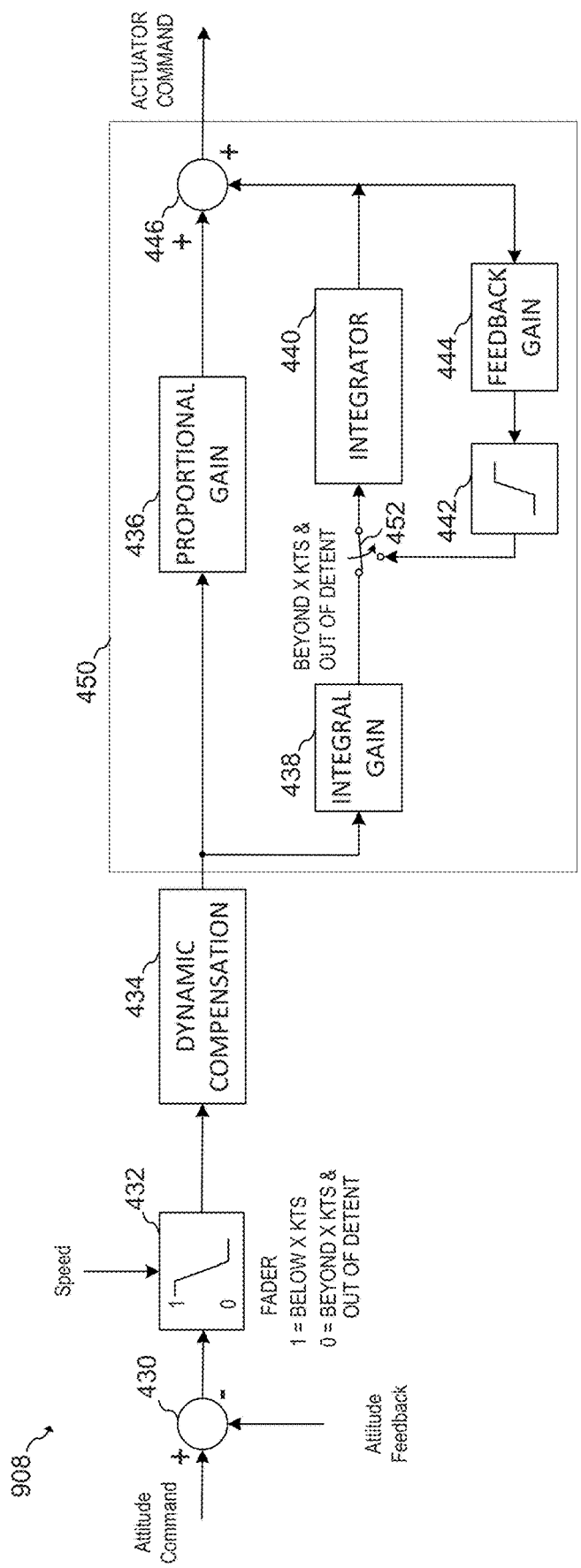
FIG. 10 illustrates a block diagram of an embodiment attitude controller.

FIG. 10 illustrates a block diagram of outer loop attitude controller 908 according to an embodiment of the present invention that may be used to implement outer loop attitude controllers 908a and 908b illustrated in FIG. 9. Outer loop attitude controller 908 is implemented and operates in a similar fashion as TRC mode attitude controller 408 described hereinabove with respect to FIG. 5. However, outer loop attitude controller 908 may be active in ACRTT, ACSH, ACAH modes and when the speed of the rotorcraft is at or below X kts.

Figure 11:
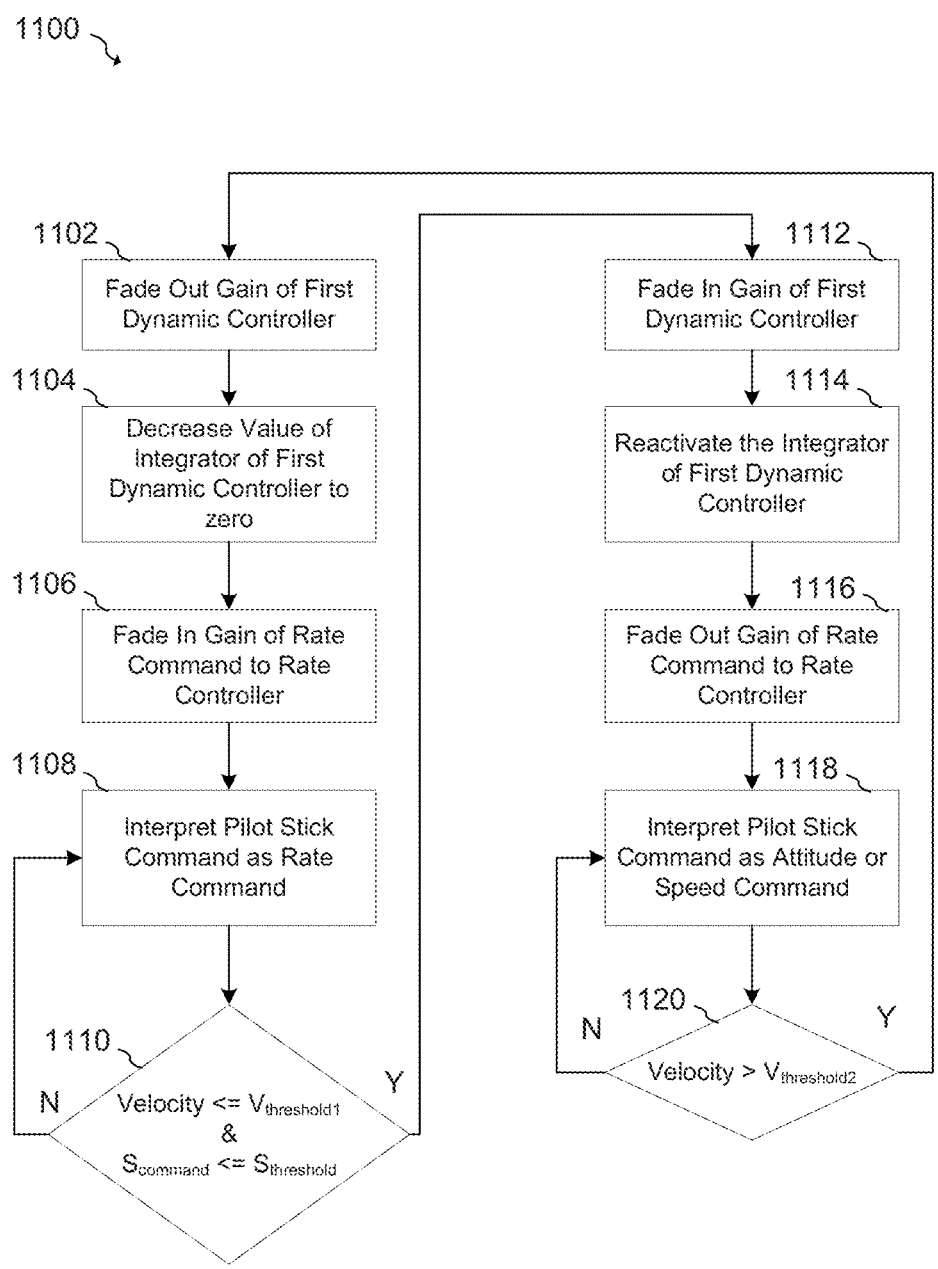
FIG. 11 illustrates a block diagram of an embodiment method of changing flight control modes.

FIG. 11 illustrates a block diagram of an embodiment method 1100 of operating a rotorcraft that may be executed, for example, by a flight computer of a fly-by-wire system. In an embodiment, the pilot stick command of the cyclic control is interpreted as an attitude or speed command in step 1118 in which the flight computer controls the rotorcraft to have a translational velocity or attitude that is proportional to a physical offset of the cyclic control. This may occur, for example, in modes TRC, ACRTT, ACSH and ACAH as described above. During step 1118, a dynamic controller adjusts the attitude or speed of the rotorcraft in order to maintain the desired translational velocity or attitude. When the velocity or attitude of the rotorcraft exceeds a threshold $V_{threshold2}$ according to step 1120 or when the pilot stick command exceeds $V_{threshold2}$, the operational mode of the flight computer transitions to a rate command mode in step 1108 in which the pilot stick command of the cyclic control is interpreted as a rate command. This may occur, for example, in a transition to the RCRTT, RCSH and RCAH modes. In these modes, the flight computer controls the rotorcraft to have a rate that is proportional to the physical offset of the cyclic control.

In order to provide a smooth transition from the speed/attitude command modes of step 1118 to the rate command mode of step 1108 and to reduce the occurrence of physical transients of the rotorcraft, steps 1102, 1104 and 1106 are executed by the flight computer. In step 1102, the gain of a first dynamic controller, which may be implemented, for example, as outer loop controller that provides a rate control in response to a desired attitude command, is faded out over first period of time or given range of speed. In step 1104, a state of an integrator of the first dynamic controller is decreases over a second period of time, and in step 1106 a gain of the pilot stick command is faded in over a third period of time. In some embodiments, steps 1102, 1104 and 1106 occur concurrently such that the gain of the first dynamic controller is reduced at the same time as the gain of the pilot stick command to the rate controller is faded in. During this time, the value of the integrator is reduced. In some embodiments, the value of the integrator is decremented by disconnecting the integrator from the input of the first dynamic controller and coupling the input of the integrator to its output. The input and/or output value of the integrator may be limited while the integrator value is reduced in order to increase the amount of time that it takes to decrement the value of the integrator to zero.

The rate command continues to be determined by the pilot stick command in step 1108 until the velocity of the rotorcraft is less than or equal to threshold $V_{threshold1}$ and the stick command $S_{command}$ is less than an offset $S_{threshold}$ that represents a particular translational velocity or attitude command according to step 1110. In some embodiments, $S_{threshold}$ may be set to a pilot stick offset that is less than 3 kts. Alternatively, other thresholds may be used. Once this condition is detected, the operational mode of the flight computer transitions to the translational rate command mode of step 1118 via steps 1112, 1114 and 1116. In some embodiments, threshold $V_{threshold1}$ is equal to threshold $V_{threshold2}$, while in other embodiments, $V_{threshold2}$ is greater threshold $V_{threshold1}$ in order to provide hysteresis. In step 1112, the gain of the first dynamic controller is faded in, in step 1114, the integrator of the first dynamic controller is reactivated by coupling its input to the signal path of the first dynamic controller, and in step 1116 the gain of the pilot stick command to the rate controller is faded out. In some embodiments, steps 1112, 1114 and 1116 occur concurrently such that the gain of the first dynamic controller is increased at the same time as the gain of the pilot stick command to the rate controller is reduced and at the same time the integrator of the first dynamic controller is reactivated.

Figure 12:
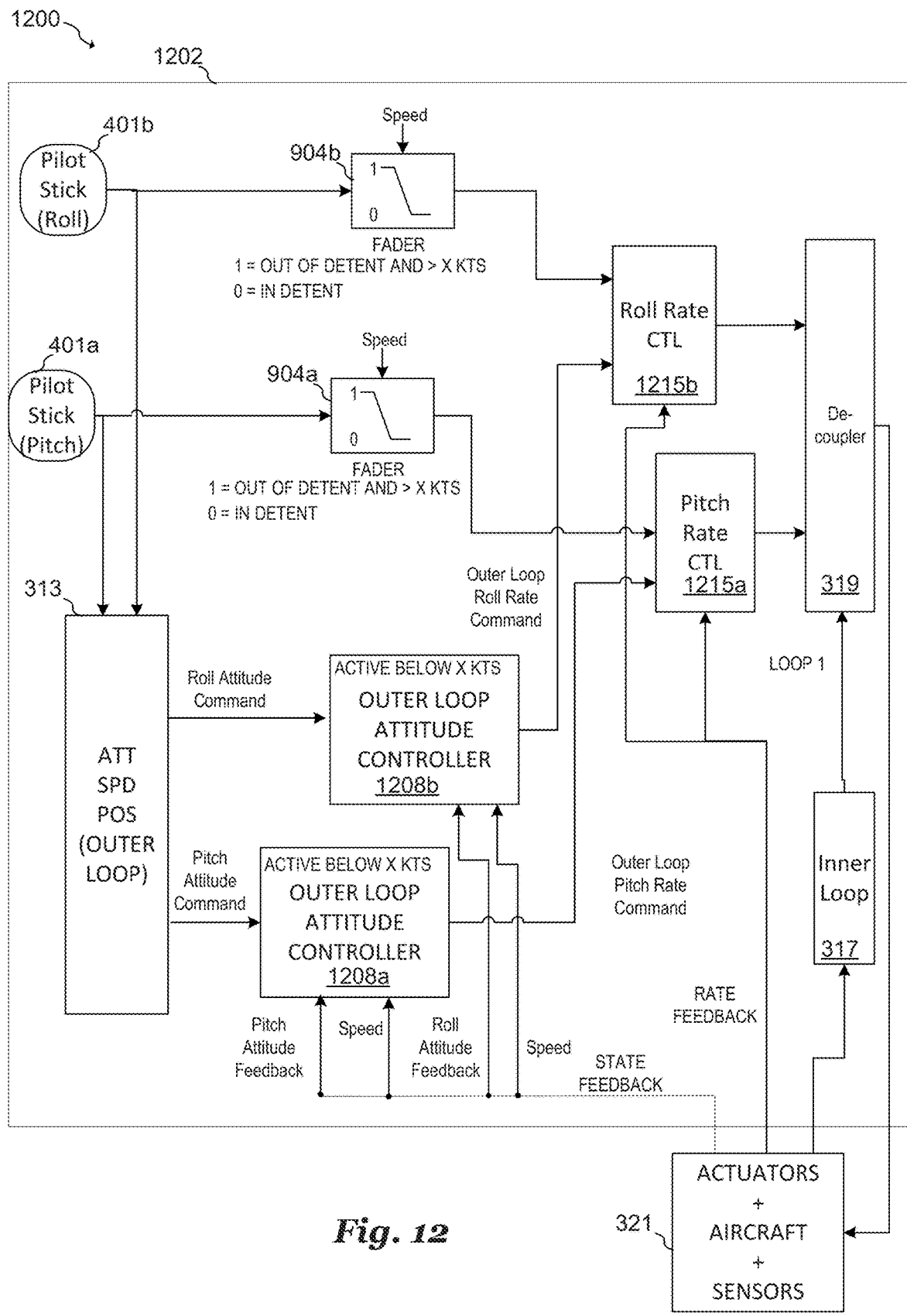
FIG. 12 illustrates a block diagram of a flight control system that supports multiple mode transitions according to a further embodiment.

FIG. 12 illustrates a flight control system 1200 according to an embodiment of the present invention. Flight control system 1200 is similar to flight control system 900 described above with respect to FIG. 9, with the exception that the output of outer loop attitude controllers 908*a* and 908*b* are replaced by outer loop attitude controllers 1208*a* and 1208*b*, pitch rate controller 315*a* is replace by pitch rate controller 1215*a*, and roll rate controller 315*b* is replaced by roll rate controller 1215*b*, and summing blocks 412*a* and 412*b* are removed. Instead of routing the outputs of outer loop attitude controllers 1208*a* and 1208*b* to summing blocks coupled to the outputs of pitch rate controller 1215*a* and 1215*b*, the outputs of outer loop attitude controllers 1208*a* and 1208*b* are coupled to inputs of pitch rate controller 1215*a* and roll rate controller 1215*b*, respectively. The functionality of flight control system 1200 shown in FIG. 12 may be the same as the functionality of flight control system 900 shown in FIG. 9 in some embodiments.

Figure 13:
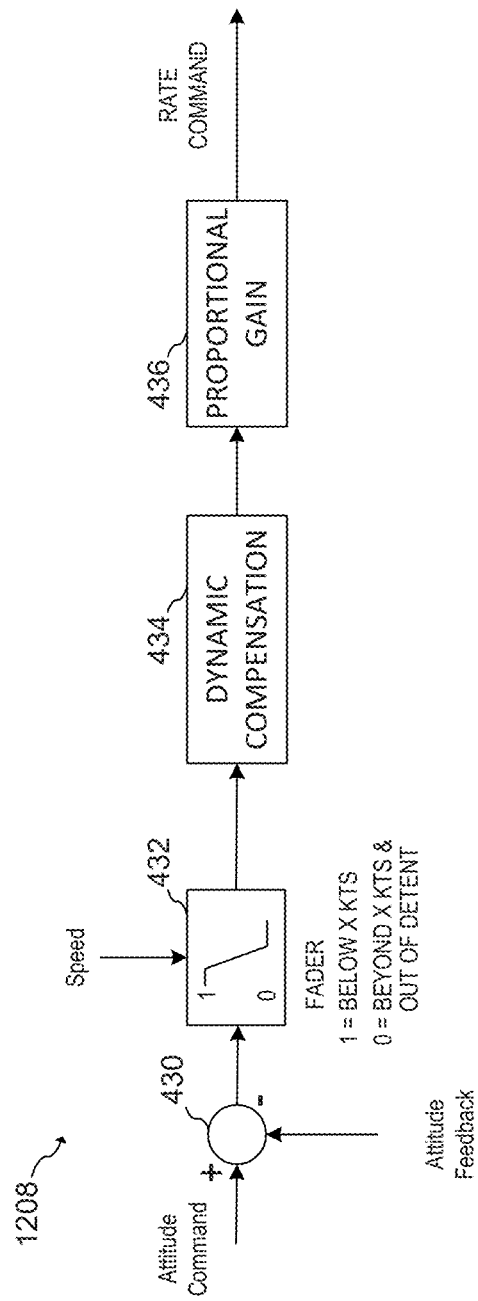
FIG. 13 illustrates a block diagram of an attitude controller according to a further embodiment.

FIG. 13 illustrates a block diagram of outer loop attitude controller 1208 that may be used to implement outer loop attitude controllers 1208*a* and 1208*b* illustrated in FIG. 12. As shown, outer loop attitude controller 1208 includes subtractor 430, fader 432, dynamic compensation block 434 and proportional gain block 436. Subtractor 430 produces an error signal based on the attitude command produced by the outer loop controller 313 (FIG. 12) and dynamic compensation block 434 compensates for the dynamics of the rotorcraft in order to improve stability and/or adjust the time response of the attitude loop. Dynamic compensation block 434 may include various control blocks known in the art including but not limited a PID controller and a lead-lag compensator. Proportional gain block 436 is used to produce the rate command and may be used to impart a proportional gain to the output of dynamic compensation block 434. Proportional gain block 436 may be implemented, for example, by performing a multiplication or scaling operation.

During a first mode of operation when the rotorcraft has a ground speed below a predetermined speed threshold (represented by X kts), fader 432 has a gain of one or some other constant gain. This effectively couples the output of outer loop controller 313 to one of rate controllers 1215*a* or 1215*b*. On the other hand, in a second mode of operation in which the rotorcraft has a ground speed of X kts and above or the speed command by displacement on the cyclic controller is greater than X kts, fader 432 has a gain of zero. When fader 432 has a gain of zero, the output of outer loop controller 313 is effectively disconnected from rate controller 1215*a* and/or rate controller 1215*b*.

In various embodiments, when the ground speed of the rotorcraft exceeds the X kts threshold, the gain of fader 432 linearly decreases to zero over a predetermined time period. In some embodiments, the speed threshold is about 10 kts; however, other speed thresholds may be used depending on the particular embodiment and its specifications. The first and second modes of operation may represent any of the modes detailed above with respect to FIGS. 8A and 8B. In some embodiments the first mode of operation represents one of the modes of operation shown in the second column of FIG. 8B when the ground speed of the rotorcraft is X kts and below. This first mode of operation may include, for example, TRC, ACRTT, ACSH, ACAH, RCRTT and/or RCSH. The second mode of operation represents one of the modes of operation shown in the third column of FIG. 8B when the ground speed of the rotorcraft is greater than X kts. This second mode of operation may include, for example, ACAH, ACRTT, ACSH, RCAH, RCRTT and RCSH. In some embodiments, the first mode of operation is a speed control mode or an attitude control mode, while the second mode of operation is a rate control mode.

In some embodiments, mode switching systems and methods may be applied to other types of aircraft besides rotorcraft. For example, in an embodiment flight control system directed to fixed-wing aircraft, the a change in the pilot stick command may be configured to produce a corresponding change in speed or attitude in the first mode, while a change in the pilot stick command in the second mode of operation may be configured to produce a change in rate or to directly control the control surfaces or the motor power in a fixed wing aircraft.

Figure 14A:
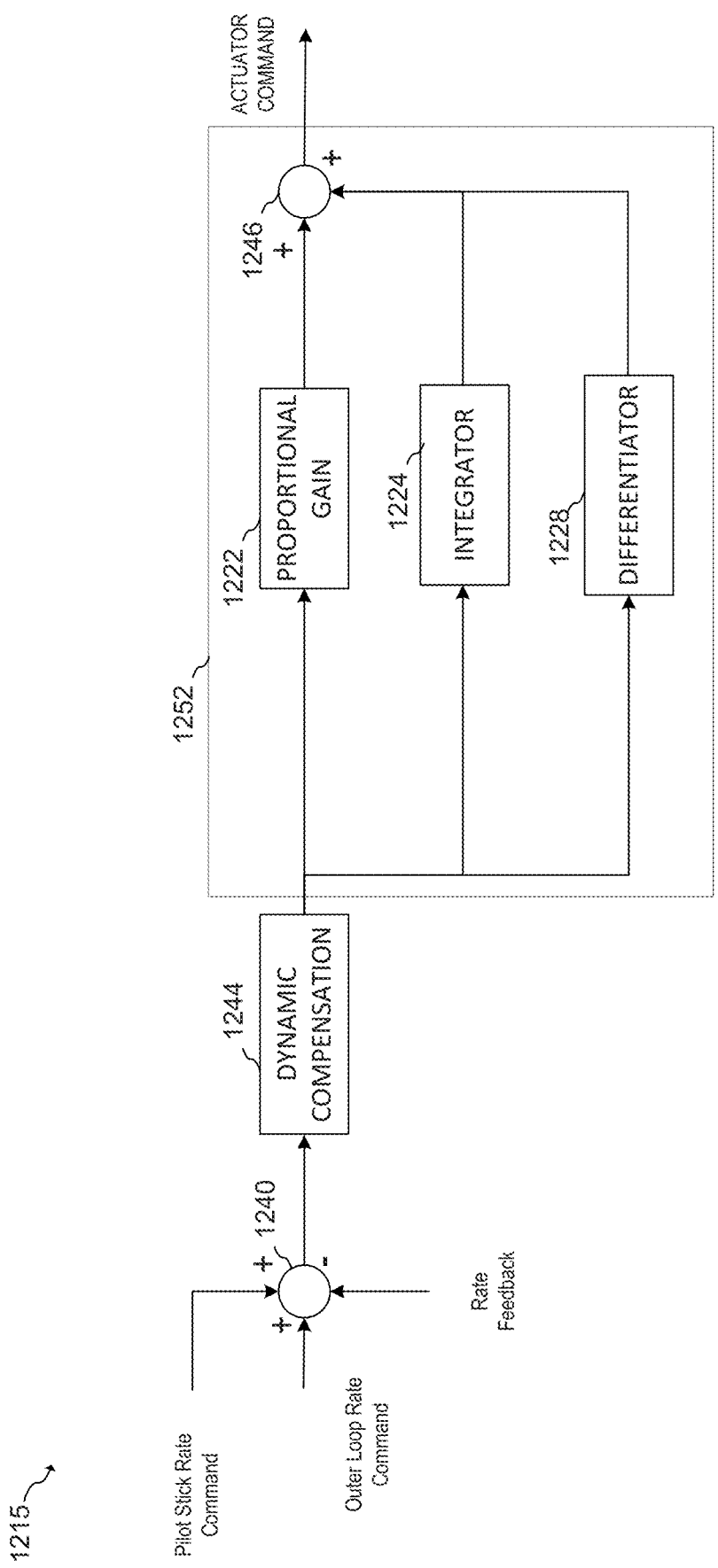
FIGS. 14A-B illustrate block diagrams of embodiment rate controllers.

FIG. 14A illustrates a block diagram of rate controller 1215 that may be used to implement rate controllers 1215*a* and 1215*b* shown in FIG. 12. As shown, rate controller 1215 includes summing block 1240, followed by dynamic compensation block 1244 and PID controller 1252. Summing block 1240 forms a sum of the pilot stick rate command generated by pilot stick 401*a* and/or 401*b* and the output of outer loop attitude controller 1208*a* and/or 1208*b*. Dynamic compensation block 1244 may compensate for the dynamics of the rotorcraft in order to improve stability and/or adjust the time response of the rate loop. Dynamic compensation block 1244 may include various control blocks known in the art including but not limited a PID controller and a lead-lag compensator. PID controller 1252 is used to produce the actuator command and may be implemented using proportional gain block 1222, integrator 1224 and differentiator 1228. In some embodiments PID controller 1252 may be replaced by other dynamic controller topologies known in the art. Proportional gain block 1222 may be implemented, for example, by performing a multiplication or scaling operation. Integrator 1224 may be implemented, for example, using an accumulator; and differentiator 1228 may be implemented, for example, using subtraction circuit that is configured to subtract a previous value from a present value. In some embodiments, the embodiments of FIGS. 12, 13 and 14A may be operated according to method 1100 described above with respect to FIG. 11.

Figure 14B:
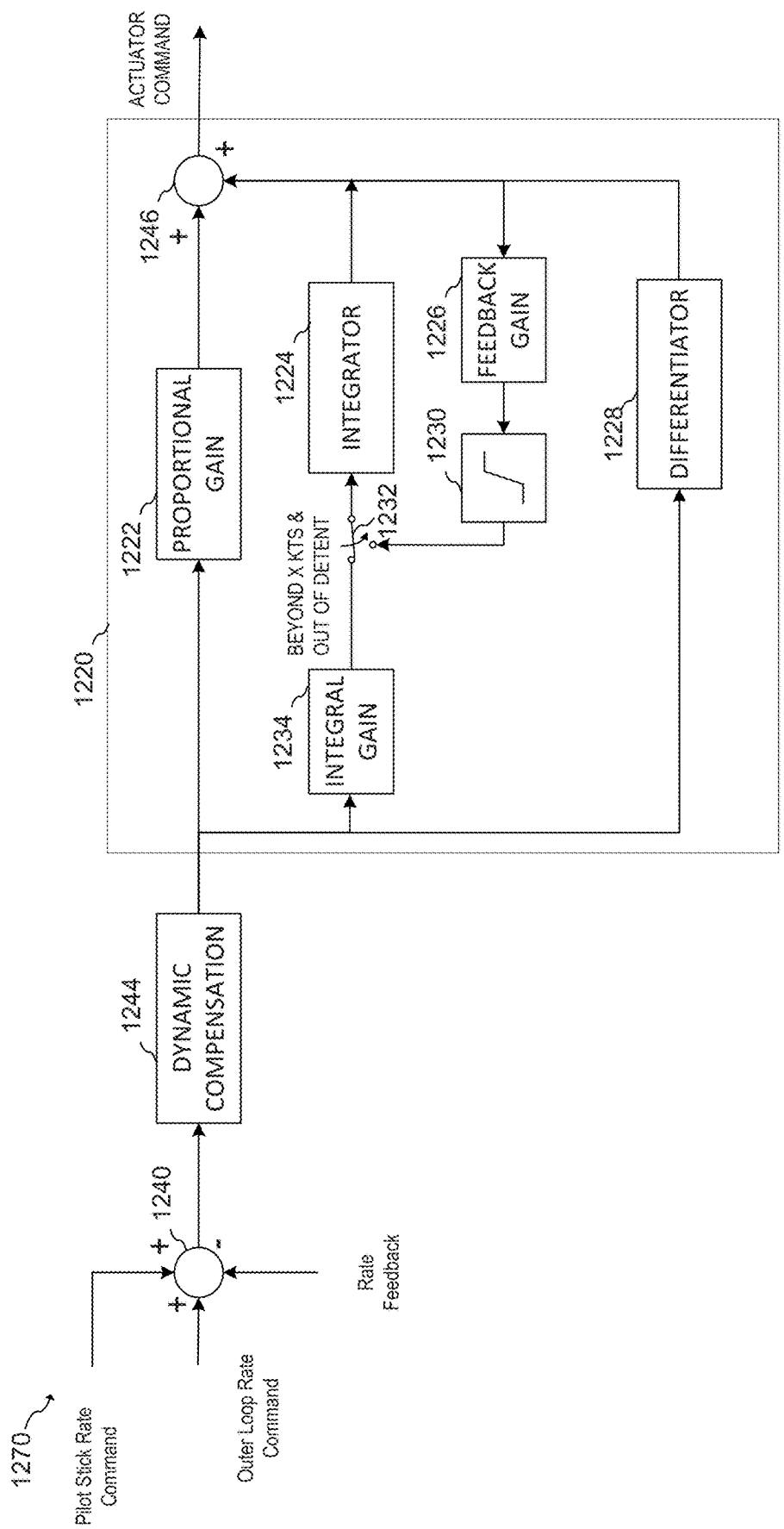

FIG. 14B illustrates a block diagram of rate controller 1270 that can be used to implement rate controllers 1215*a* and 1215*b* according to an alternative embodiment of the present invention. The structure of rate controller 1270 is similar to the structure of rate controller 1215 shown in FIG. 14A, with the exception that the integrator of PID controller 1220 can be activated and deactivated during operation in a similar manner as integrator 440 in FIG. 10 described above.

During operation in the first mode when the rotorcraft has a ground speed of less than X kts, the input of integrator 1224 is coupled to the output of dynamic compensation block 1244 via integral gain block 1234. On the other hand, in the second mode in which the rotorcraft has a ground speed of X kts and above and the speed command by displacement on the cyclic controller is greater than X kts, the input of integrator 1224 is coupled to its output via feedback gain block 1226 and limiter 1230, which effectively causes integrator 1224 to decrement to zero or to a DC value representing zero output. When the ground speed of the rotorcraft exceeds the X kts threshold, the input of the integrator 1224 is switched from the output of integral gain block 1234 to the output of limiter 1230. Once the input to integrator 1224 is switched to the output of limiter 1230 via switch 1232, the feedback action of the loop formed by integrator 1224, feedback gain 1226 and limiter 1230 forces the output of integrator 1224 decrement to zero over a period of time. Limiter 1230 limits the rate at which integrator 1224 is decremented such that the decay of integrator 1224 has more of a ramp response instead of an exponential response for high integrator output values. In some embodiments, the fade-in and fade-out times of faders 904a, 904b, 432, and 1230 may be the same or they may be different from each other depending on the change in speed.

Figure 15:
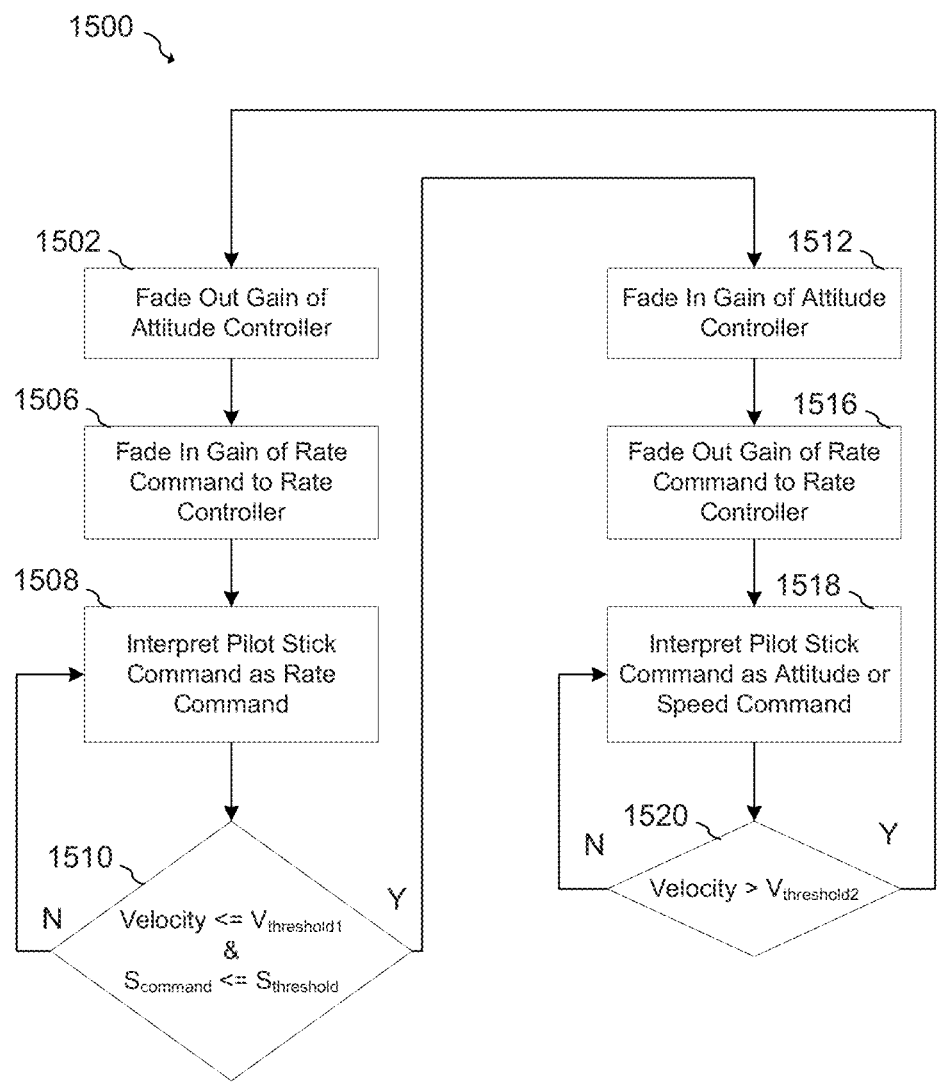
FIG. 15 illustrates a block diagram a method of changing flight control modes according to a further embodiment.

FIG. 15 illustrates a block diagram of an embodiment method 1500 of operating an aircraft that may be executed, for example, by a flight computer of a fly-by-wire system. In some embodiments, method 1500 may be applied to the embodiments described above with respect to FIGS. 12, 13 and 14B. In an embodiment, the pilot stick command is interpreted as an attitude or speed command in step 1518 in which the flight computer controls the aircraft to have a translational velocity or attitude that is proportional to a physical offset of the pilot stick. This may occur, for example, in modes TRC, ACRTT, ACSH and ACAH as described above. During step 1518, an attitude controller adjusts the attitude or speed of the aircraft in order to maintain the desired translational velocity or attitude. When the velocity or attitude of the rotorcraft exceeds a threshold $V_{threshold2}$ according to step 1520 or when the pilot stick command exceeds $V_{threshold2}$, the operational mode of the flight computer transitions to a rate command mode in step 1508 in which the pilot stick command is interpreted as a rate command. This may occur, for example, in a transition to the RCRTT, RCSH and RCAH modes. In these modes, the flight computer controls the rotorcraft to have a rate that is proportional to the physical offset of the pilot stick.

In order to provide a smooth transition from the speed/attitude command modes of step 1518 to the rate command mode of step 1508 and to reduce the occurrence of physical transients of the rotorcraft, steps 1502 and 1506 are executed by the flight computer. In step 1502, the gain of an attitude controller, which may be implemented, for example, as outer loop controller that provides a response to a desired attitude command, is faded out over first period of time or given range of speed. In step 1506 a gain of the pilot stick command is faded in over a second period of time. In some embodiments, steps 1502 and 1506 occur concurrently such that the gain of the attitude controller is reduced at the same time as the gain of the pilot stick command to the rate controller is faded in.

The rate command continues to be determined by the pilot stick command in step 1508 until the velocity of the rotorcraft is less than or equal to threshold $V_{threshold1}$ and the pilot stick command $S_{command}$ is less than an offset $S_{threshold}$ that represents a particular translational velocity or attitude command according to step 1510. In some embodiments, $S_{threshold}$ may be set to a pilot stick offset that is less than 3 kts. Alternatively, other thresholds may be used. Once this condition is detected, the operational mode of the flight computer transitions to the translational rate command mode of step 1518 via steps 1512 and 1516. In some embodiments, threshold $V_{threshold1}$ is equal to threshold $V_{threshold2}$, while in other embodiments, $V_{threshold2}$ is greater threshold $V_{threshold1}$ in order to provide hysteresis. In step 1512, the gain of the attitude controller is faded in, and in step 1516 the gain of the pilot stick command to the rate controller is faded out. In some embodiments, steps 1512 and 1516 occur concurrently such that the gain of the attitude controller is increased at the same time as the gain of the pilot stick command to the rate controller is reduced.

Embodiments of the present invention are summarized here. Other embodiments can also be understood from the entirety of the specification and the claims filed herein.

Example 1

A method of operating an aircraft includes operating the aircraft in a first mode including determining an attitude based on a pilot stick signal generated by a pilot stick assembly, determining a first rate command based on the determined attitude using an attitude controller, determining an actuator command based on the determined first rate command, determining the actuator command including using a rate controller having an integrator, and providing an output of the rate controller to an actuator, where a translational speed or an attitude of the aircraft is proportional to an amplitude of the pilot stick signal in the first mode; transitioning from the first mode to a second mode when a velocity of the aircraft exceeds a first velocity threshold, transitioning including fading out a gain of the attitude controller over a first period of time; and operating the aircraft in the second mode including providing the pilot stick signal to an input of the rate controller, where the output of the rate controller is proportional to the amplitude of the pilot stick signal.

Example 2

The method of example 1, where transitioning from the first mode to the second mode further includes decreasing a value of the integrator over a second period of time.

Example 3

The method of one of examples 1 or 2, where determining the attitude based on the pilot stick signal includes determining the translational speed based on the pilot stick signal by determining a forward speed component based on a cyclic longitude stick control portion of the pilot stick signal and determining a lateral speed component based on a cyclic latitude stick control portion of the pilot stick signal; and determining a pitch attitude based on the determined forward speed component and a roll attitude based on the determined lateral speed component.

Example 4

The method of one of examples 1 to 3, where determining the attitude based on the pilot stick signal includes determining a pitch attitude based on a cyclic longitude stick control portion of the pilot stick signal and determining a roll attitude based on a cyclic latitude stick control portion of the pilot stick signal.

Example 5

The method of one of examples 1 to 4, further including transitioning from the second mode to the first mode when the velocity of the aircraft decreases below a second velocity threshold, transitioning from the second mode to the first mode including: fading in the gain of the attitude controller over a third period of time, and reactivating the integrator.

Example 6

The method of example 5, further including: fading in a gain of the pilot stick signal in the rate controller over a fourth period of time when a pilot stick of the pilot stick assembly is out of detent; and fading out the gain of the pilot stick signal in the rate controller over a fifth period of time when the pilot stick of the pilot stick assembly is in detent.

Example 7

The method of one of examples 5 or 6, where the first velocity threshold is greater than the second velocity threshold.

Example 8

The method of one of examples 1 to 7, where decreasing the value of the integrator includes coupling the output of the integrator to an input of the integrator via a first feedback path.

Example 9

The method of example 8, where the first feedback path includes a limiter.

Example 10

The method of one of examples 1 to 9, where the first mode includes a translational rate command, where a speed of the aircraft is proportional to the pilot stick signal.

Example 11

The method of one of examples 1 to 10, where the first mode includes an attitude command, where an attitude of the aircraft is proportional to the pilot stick signal.

Example 12

A flight control system for an aircraft including: a processor and a non-transitory computer readable storage medium with an executable program stored thereon, the executable program including instructions to: receive a pilot control signal via a first interface of the processor; in a first mode determine an attitude based on the received pilot control signal, determine a first rate command based on the determined attitude using an attitude controller, determine an actuator command based on the determined first rate command, determining the actuator command including executing a rate controller that has an integrator, and providing an output of the rate controller to an actuator via a second interface of the processor, where a state of the aircraft corresponding to the attitude is configured to be proportional to the received pilot control signal; and transitioning from the first mode to a second mode when a first condition of the aircraft crosses a first predetermined threshold, transitioning including fading out a gain of the attitude controller over a first period of time, and decreasing a value of the integrator over a second period of time; and in the second mode, providing the pilot control signal to an input of the rate controller, where the output of the rate controller is proportional to the received pilot control signal.

Example 13

The flight control system of example 12, where in the first mode, the received pilot control signal represents a translational speed command, the determined attitude is based on the translational speed command, and the first condition of the aircraft is a velocity of the aircraft.

Example 14

The flight control system of one of examples 12 or 13, where in the first mode, the received pilot control signal represents an attitude command, the determined attitude is based on the attitude command, and the first condition of the aircraft is a velocity of the aircraft.

Example 15

The flight control system of one of examples 12 to 14, where: the determined attitude includes a pitch attitude and a roll attitude; executing the rate controller includes executing a first pitch dynamic controller having a pitch integrator and executing a first roll dynamic controller having a roll integrator; and providing the output of the rate controller to the actuator via the second interface of the processor includes providing an output of the first pitch dynamic controller to a pitch actuator and providing an output of the first roll dynamic controller to a roll actuator.

Example 16

The flight control system of one of examples 12 to 15, where the executable program further includes instructions to fade in a gain of the pilot control signal in the rate controller when a pilot control stick is out of detent; and fade out the gain of the pilot control signal in the rate controller when the pilot control stick is in detent.

Example 17

The flight control system of one of examples 12 to 16, where the executable program further includes instructions to transition from the second mode to the first mode when the first condition of the aircraft decreases below a second predetermined threshold, where transitioning from the second mode to the first mode includes: fading in the gain of the attitude controller over a third period of time, and reactivating the integrator.

Example 18

The flight control system of example 17, where the first predetermined threshold is greater than the second predetermined threshold.

Example 19

The flight control system of one of examples 12 to 18, where decreasing the value of the integrator includes coupling the output of the integrator to an input of the integrator via a first feedback path.

Example 20

The flight control system of example 19, where the first feedback path includes a limiter.

Example 21

The flight control system of one of examples 12 to 20, where the first mode includes a translational rate command, where a speed of the aircraft is proportional to the pilot control signal.

Example 22

The flight control system of one of examples 12 to 21, where the first mode includes an attitude command, where an attitude of the aircraft is proportional to the pilot control signal.

Example 23

A rotorcraft including: a body; a power train coupled to the body and including a power source and a drive shaft coupled to the power source; a rotor system coupled to the power train and including a plurality of rotor blades; a flight control system operable to change at least one operating condition of the rotor system; a pilot control assembly configured to receive commands from a pilot, where the flight control system is a fly-by-wire flight control system in electrical communication with the pilot control assembly; and a flight control computer in electrical communication between the flight control system and the pilot control assembly, the flight control computer configured to: receive, from the pilot control assembly a pilot command to change a first flight characteristic, when a velocity of the rotorcraft is less than a first velocity threshold, interpret the first flight characteristic as a requested translational speed or as a requested attitude in a first mode, determine a controlled attitude based on the requested translational speed or the requested attitude using an attitude controller, determining a first rate command based on the determined attitude, and determine an actuator command based on the determined rate command using a rate controller; when the velocity of the rotorcraft is greater than a second velocity threshold, interpret the first flight characteristic as a rate in a second mode by providing the pilot command to the rate controller, and when the velocity of the rotorcraft increases past the second velocity threshold, fade out a gain of the attitude controller, and successively decrease a value of an integrator in the rate controller.

Example 24

The rotorcraft of example 23, where: the controlled attitude includes a controlled pitch attitude; and the rate includes a pitch rate.

Example 25

The rotorcraft of example 23, where: the controlled attitude further includes a controlled roll attitude; and the rate further includes a roll rate.

Example 26

The rotorcraft of one of examples 23 to 25, where the flight control computer is further configured to transition from the second mode to the first mode when the velocity of the rotorcraft decreases below the first velocity threshold, and transitioning from the second mode to the first mode includes: fading in the gain of the attitude controller, and reactivating the integrator.

Example 27

The rotorcraft of one of examples 23 to 26, where the flight control computer is further configured to: fade in a gain of the pilot command to the rate controller when a pilot stick of the pilot control assembly is out of detent; and fade out the gain of the pilot command to the rate controller when the pilot stick of the pilot control assembly is in detent.

Advantages of embodiments include the ability to automatically and smoothly transition between a TRC mode and a rate control mode or between a translational speed hold mode and a rotational rate control mode. Further advantages include making the transition smooth and seamless enough that little change in attitude is noticeable to pilot or occupants of the aircraft.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating an aircraft, the method comprising:
   operating the aircraft in a first mode comprising
   determining an attitude based on a pilot stick signal generated by a pilot stick assembly,
   determining a first rate command based on the determined attitude using an attitude controller,
   determining an actuator command based on the determined first rate command, determining the actuator command comprising using a rate controller having an integrator, and
   providing an output of the rate controller to an actuator, wherein a translational speed or an attitude of the aircraft is proportional to an amplitude of the pilot stick signal in the first mode;
   transitioning from the first mode to a second mode when a velocity of the aircraft exceeds a first velocity threshold, the transitioning comprising
   fading out a gain of the attitude controller over a first predetermined period of time, and
   successively decreasing a value of the integrator over a second predetermined period of time; and
   operating the aircraft in the second mode comprising
   providing the pilot stick signal to an input of the rate controller, wherein the output of the rate controller is proportional to the amplitude of the pilot stick signal.

2. The method of claim 1, wherein determining the attitude based on the pilot stick signal comprises
  determining the translational speed based on the pilot stick signal by determining a forward speed component based on a cyclic longitude stick control portion of the pilot stick signal and determining a lateral speed component based on a cyclic latitude stick control portion of the pilot stick signal; and
  determining a pitch attitude based on the determined forward speed component and a roll attitude based on the determined lateral speed component.

3. The method of claim 1, wherein determining the attitude based on the pilot stick signal comprises determining a pitch attitude based on a cyclic longitude stick control portion of the pilot stick signal and determining a roll attitude based on a cyclic latitude stick control portion of the pilot stick signal.

4. The method of claim 1, wherein the first mode comprises a translational rate command mode, wherein a speed of the aircraft is proportional to the pilot stick signal.

5. The method of claim 1, wherein the first mode comprises an attitude command mode, wherein the attitude of the aircraft is proportional to the pilot stick signal.

6. The method of claim 1, further comprising transitioning from the second mode to the first mode when the velocity of the aircraft decreases below a second velocity threshold, transitioning from the second mode to the first mode comprising:
  fading in the gain of the attitude controller over a third predetermined period of time, and
  reactivating the integrator.

7. The method of claim 6, further comprising:
  fading in a gain of the pilot stick signal in the rate controller over a fourth predetermined period of time when a pilot stick of the pilot stick assembly is out of detent; and
  fading out the gain of the pilot stick signal in the rate controller over a fifth predetermined period of time when the pilot stick of the pilot stick assembly is in detent.

8. The method of claim 6, wherein the first velocity threshold is greater than the second velocity threshold.

9. The method of claim 1, wherein decreasing the value of the integrator comprises coupling the output of the integrator to an input of the integrator via a first feedback path.

10. The method of claim 9, wherein the first feedback path comprises a limiter.

11. A flight control system for an aircraft comprising:
  a processor and a non-transitory computer readable storage medium with an executable program stored thereon, the executable program including instructions to:
  receive a pilot control signal via a first interface of the processor;
  in a first mode
    determine an attitude based on the received pilot control signal,
    determine a first rate command based on the determined attitude using an attitude controller,
    determine an actuator command based on the determined first rate command, determining the actuator command comprising executing a rate controller that has an integrator, and
    provide an output of the rate controller to an actuator via a second interface of the processor, wherein a state of the aircraft corresponding to the attitude is configured to be proportional to the received pilot control signal; and
  transition from the first mode to a second mode when a first condition of the aircraft crosses a first predetermined threshold, the transitioning comprising
    fading out a gain of the attitude controller over a first predetermined period of time, and
    decreasing a value of the integrator over a second predetermined period of time; and
  in the second mode, provide the pilot control signal to an input of the rate controller, wherein the output of the rate controller is proportional to the received pilot control signal.

12. The flight control system of claim 11, wherein in the first mode, the received pilot control signal represents a translational speed command, the determined attitude is based on the translational speed command, and the first condition of the aircraft is a velocity of the aircraft.

13. The flight control system of claim 11, wherein in the first mode, the received pilot control signal represents an attitude command, the determined attitude is based on the attitude command, and the first condition of the aircraft is a velocity of the aircraft.

14. The flight control system of claim 11, wherein:
  the determined attitude comprises a pitch attitude and a roll attitude;
  executing the rate controller comprises executing a first pitch dynamic controller having a pitch integrator and executing a first roll dynamic controller having a roll integrator; and
  providing the output of the rate controller to the actuator via the second interface of the processor comprises providing an output of the first pitch dynamic controller to a pitch actuator and providing an output of the first roll dynamic controller to a roll actuator.

15. The flight control system of claim 11, wherein the executable program further includes instructions to:
  fade in a gain of the pilot control signal in the rate controller when a pilot control stick is out of detent; and
  fade out the gain of the pilot control signal in the rate controller when the pilot control stick is in detent.

16. The flight control system of claim 11, wherein the first mode comprises a translational rate command mode, wherein a speed of the aircraft is proportional to the pilot control signal.

17. The flight control system of claim 11, wherein the first mode comprises an attitude command mode, wherein an attitude of the aircraft is proportional to the pilot control signal.

18. The flight control system of claim 11, wherein the executable program further includes instructions to transition from the second mode to the first mode when the first condition of the aircraft decreases below a second predetermined threshold, wherein transitioning from the second mode to the first mode comprises:
  fading in the gain of the attitude controller over a third predetermined period of time, and reactivating the integrator.

19. The flight control system of claim 18, wherein the first predetermined threshold is greater than the second predetermined threshold.

20. The flight control system of claim 11, wherein decreasing the value of the integrator comprises coupling the output of the integrator to an input of the integrator via a first feedback path.

21. The flight control system of claim 20, wherein the first feedback path comprises a limiter.

22. A rotorcraft comprising:
a body;
a power train coupled to the body and comprising a power source and a drive shaft coupled to the power source;
a rotor system coupled to the power train and comprising a plurality of rotor blades;
a flight control system operable to change at least one operating condition of the rotor system;
a pilot control assembly configured to receive commands from a pilot, wherein the flight control system is a fly-by-wire flight control system in electrical communication with the pilot control assembly; and
a flight control computer in electrical communication between the flight control system and the pilot control assembly, the flight control computer configured to:
receive, from the pilot control assembly a pilot command to change a first flight characteristic,
when a velocity of the rotorcraft is less than a first velocity threshold, interpret the first flight characteristic as a requested translational speed or as a requested attitude in a first mode, determine a controlled attitude based on the requested translational speed or the requested attitude using an attitude controller, determine a first rate command based on the determined attitude, and determine an actuator command based on the determined first rate command using a rate controller,
when the velocity of the rotorcraft is greater than a second velocity threshold, interpret the first flight characteristic as a rate in a second mode by providing the pilot command to the rate controller, and
when the velocity of the rotorcraft increases past the second velocity threshold, fade out a gain of the attitude controller, and successively decrease a value of an integrator in the rate controller.

23. The rotorcraft of claim 22, wherein the flight control computer is further configured to transition from the second mode to the first mode when the velocity of the rotorcraft decreases below the first velocity threshold, and transitioning from the second mode to the first mode comprises:
fading in the gain of the attitude controller, and
reactivating the integrator.

24. The rotorcraft of claim 22, wherein the flight control computer is further configured to:
fade in a gain of the pilot command to the rate controller when a pilot stick of the pilot control assembly is out of detent; and
fade out the gain of the pilot command to the rate controller when the pilot stick of the pilot control assembly is in detent.

25. The rotorcraft of claim 22, wherein the flight control computer is configured to successively decrease the value of the integrator in the rate controller over a predetermined period of time when the velocity of the rotorcraft increases past the second velocity threshold.

26. The rotorcraft of claim 22, wherein:
the controlled attitude comprises a controlled pitch attitude; and
the rate comprises a pitch rate.

27. The rotorcraft of claim 26, wherein:
the controlled attitude further comprises a controlled roll attitude; and
the rate further comprises a roll rate.

* * * * *